United States Patent
Kudo

(10) Patent No.: US 7,340,589 B2
(45) Date of Patent: Mar. 4, 2008

(54) SHIFT PREFIX INSTRUCTION DECODER FOR MODIFYING REGISTER INFORMATION NECESSARY FOR DECODING THE TARGET INSTRUCTION

(75) Inventor: Makoto Kudo, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 10/601,136

(22) Filed: Jun. 20, 2003

(65) Prior Publication Data

US 2004/0039897 A1    Feb. 26, 2004

(30) Foreign Application Priority Data

Jun. 24, 2002   (JP) ............................ 2002-182766

(51) Int. Cl.
*G06F 9/30*    (2006.01)
(52) U.S. Cl. ...................... 712/213; 712/212; 712/200; 712/226
(58) Field of Classification Search ................ 712/200, 712/208, 209, 213, 212, 210, 226, 205
See application file for complete search history.

(56) References Cited

U.S. PATENT DOCUMENTS

| | | | |
|---|---|---|---|
| 5,630,083 A * | 5/1997 | Carbine et al. | 712/212 |
| 5,809,273 A * | 9/1998 | Favor et al. | 712/210 |
| 5,822,559 A * | 10/1998 | Narayan et al. | 712/214 |
| 5,875,315 A * | 2/1999 | Narayan | 712/204 |
| 6,260,134 B1 * | 7/2001 | Zuraski et al. | 712/210 |
| 2002/0056035 A1 * | 5/2002 | Rozenshein et al. | 712/208 |

FOREIGN PATENT DOCUMENTS

| | | |
|---|---|---|
| CN | 1349160 | 5/2002 |
| JP | 09-231070 | 9/1997 |
| JP | 11-024929 | 1/1999 |
| JP | 2000-284962 | 10/2000 |
| JP | 2002-041284 | 2/2002 |

* cited by examiner

*Primary Examiner*—Tonia L. Meonske
(74) *Attorney, Agent, or Firm*—Hogan & Hartson LLP

(57) ABSTRACT

The data processing device and electronic equipment of the present invention perform pipeline control and include a fetch circuit which fetches instruction codes of a plurality of instructions in instruction queues. A prefix instruction decoder circuit performs a decode processing only on a prefix instruction. The prefix instruction decoder circuit receives the instruction code before decoding, judges whether or not the instruction is a given prefix instruction, and causes a target instruction to modify an information register to store information necessary for decoding a target instruction when the instruction is the given prefix instruction. A decoder circuit receives each of the instruction codes of the instructions other than the prefix instruction as a decode instruction and decodes the decode instruction. When the decode instruction is a target instruction, the target instruction modified by the prefix instruction is decoded based on the target instruction modifying information.

19 Claims, 19 Drawing Sheets

FIG. 9A

310 SHIFT PREFIX INSTRUCTION

| 15 — — — — — — — — — — — — — — — 4 | 3 | 2 | 1 0 |
|---|---|---|---|
| OPCODE | | | |

312

318 SHIFT VALUE INFORMATION

316 INFORMATION FOR LOGICAL SHIFT OR ARITHMETIC SHIFT

314 INFORMATION FOR SHIFT LEFT OR SHIFT RIGHT

FIG. 9B add  %r2, 3  →  r2 + 3

FIG. 9C ext  srl, 1
add  %r2, 3    →  r2 = (r2+3) ≫ 1

320 REGISTER EXPANSION PREFIX INSTRUCTION 322    324 REGISTER EXPANSION
       INFORMATION add %r2,3  ⟶  r2 = r2+3 ext %r1
add %r2,3  } ⟶  r1 = r2+3

FIG. 15A
330 EXECUTION CONTROL PREFIX INSTRUCTION
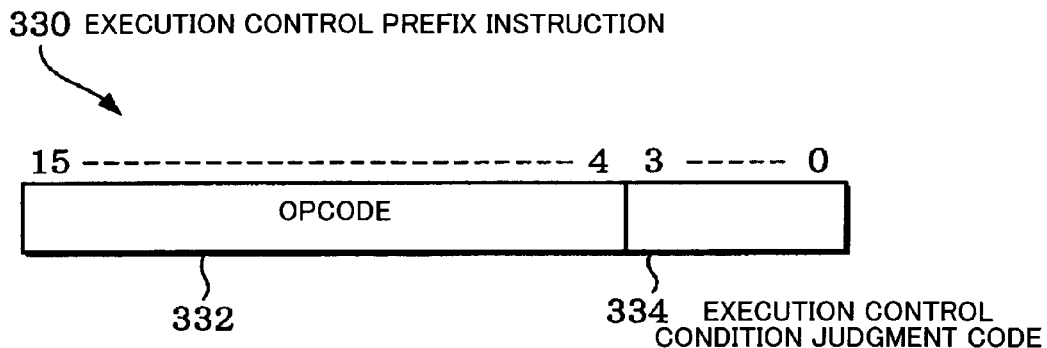
332    334 EXECUTION CONTROL
       CONDITION JUDGMENT CODE
FIG. 15B
```
cmp   %r1   %r2
ext   EQ
add   %r1   1
```
FIG. 15C
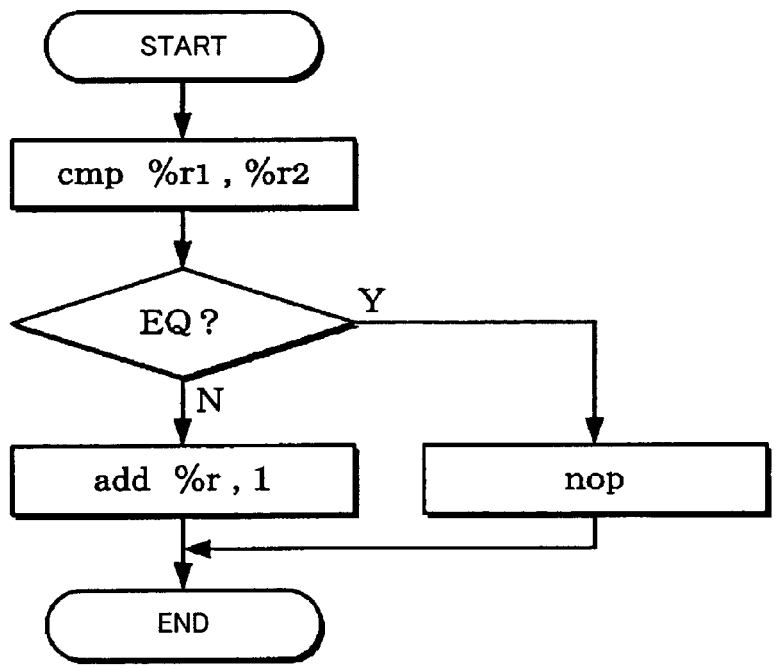

SHIFT PREFIX INSTRUCTION DECODER FOR MODIFYING REGISTER INFORMATION NECESSARY FOR DECODING THE TARGET INSTRUCTION

Japanese Patent Application No. 2002-182766 filed on Jun. 24, 2002, is hereby incorporated by reference in its entirety.

BACKGROUND OF THE INVENTION

The present invention relates to a data processing device and electronic equipment.

The applicant of the present invention has developed a microcomputer (data processing device in a broad sense) which has an instruction set including a prefix instruction which precedes a target instruction and modifies (expands) the function of the target instruction. In the case where the target instruction includes immediate data, the instruction set includes an ext instruction which expands the immediate data of the target instruction by adding higher-order bits of the prefix instruction, for example.

However, in order to realize the function of the target instruction modified by the prefix instruction in a conventional microcomputer which performs pipeline control, it is necessary to execute two instructions consisting of the prefix instruction and the target instruction, whereby two clock cycles are necessary.

The most important factor which decides the performance of the microcomputer is the execution time. Therefore, it is preferable to provide a high cost-performance microcomputer which has high execution time and can be provided at low cost.

BRIEF SUMMARY OF THE INVENTION

One aspect of the present invention relates to a data processing device which performs pipeline control, the data processing device comprising:

a fetch circuit which fetches instruction codes of a plurality of instructions in instruction queues, the instructions including a given target instruction and a prefix instruction which precedes the target instruction and modifies a function of the target instruction;

a prefix instruction decoder circuit which performs decode processing only on a prefix instruction, the prefix instruction decoder circuit receiving the instruction codes of the instructions before decoding that are fetched in the instruction queues, judging whether or not each of the instruction codes is a given prefix instruction, and causing a target instruction modifying information register to store information necessary for decoding the target instruction modified by the prefix instruction when the judged instruction code is the given prefix instruction; and a general-purpose decoder circuit which receives each of the instruction codes of the instructions fetched in the instruction queues other than the prefix instruction as a decode instruction, and decodes the decode instruction, wherein, when the decode instruction is the target instruction, the decoder circuit decodes the target instruction modified by the prefix instruction based on target instruction modifying information stored in the target instruction modifying information register.

Another aspect of the present invention relates to electronic equipment comprising:

the above data processing device,
means which receives input information; and
means which outputs a result processed by the data processing device based on the input information.

BRIEF DESCRIPTION OF THE SEVERAL VIEWS OF THE DRAWING

FIGS. 9A to 9C are views illustrating a shift prefix instruction.

FIGS. 15A to 15C are views illustrating an execution control prefix instruction.

DETAILED DESCRIPTION OF THE EMBODIMENT

Figure 1:
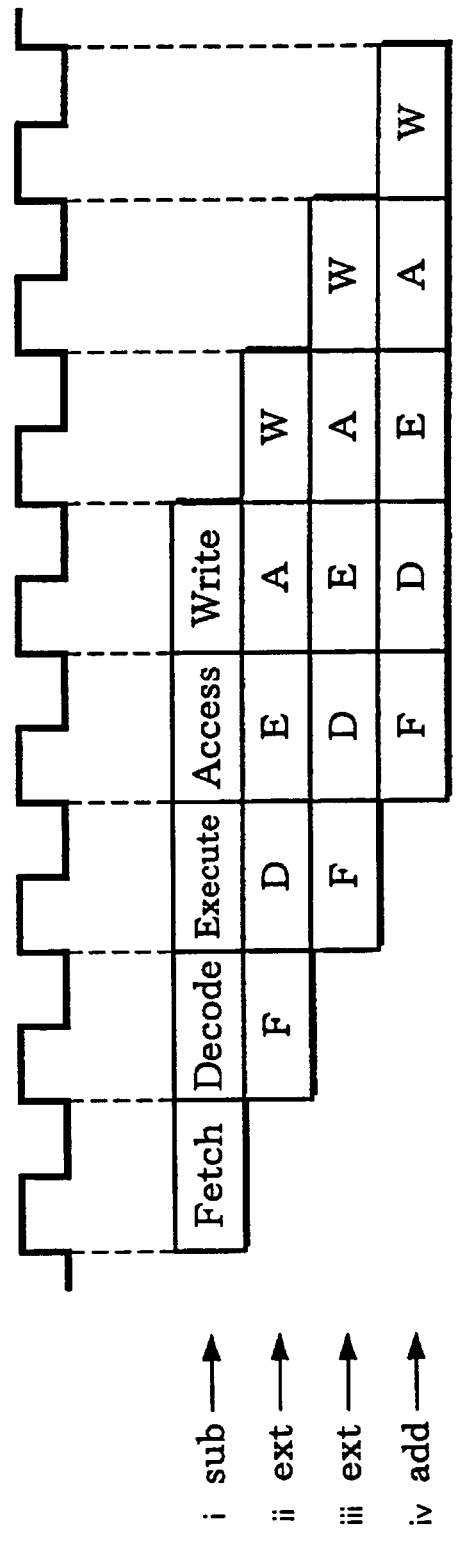
FIG. 1 is a view illustrating an example of pipeline control in a conventional microcomputer (data processing device in a broad sense).

An embodiment of the present invention is described below.

Note that the embodiments described hereunder do not in any way limit the scope of the invention defined by the claims laid out herein. Note also that all of the elements of these embodiments should not be taken as essential requirements to the present invention.

(1) One embodiment of the present invention provides a data processing device which performs pipeline control, the data processing device comprising:

a fetch circuit which fetches instruction codes of a plurality of instructions in instruction queues, the instructions including a given target instruction and a prefix instruction which precedes the target instruction and modifies a function of the target instruction;

a prefix instruction decoder circuit which performs decode processing only on a prefix instruction, the prefix instruction decoder circuit receiving the instruction codes of the instructions before decoding that are fetched in the instruction queues, judging whether or not each of the instruction codes is a given prefix instruction, and causing a target instruction modifying information register to store information necessary for decoding the target instruction modified by the prefix instruction when the judged instruction code is the given prefix instruction; and a general-purpose decoder circuit which receives each of the instruction codes of the instructions fetched in the instruction queues other than the prefix instruction as a decode instruction, and decodes the decode instruction, wherein, when the decode instruction is the target instruction, the decoder circuit decodes the target instruction modified by the prefix instruction based on target instruction modifying information stored in the target instruction modifying information register.

The target instruction and the prefix instruction which expands the function of the target instruction are input to this data processing device. The prefix instruction has a function of expanding the function of the subsequent target instruction when the target instruction is executed.

The instruction queue used herein refers to a queue in which the instruction codes are stored before decoding. The instruction queue may be a fetch queue, a prefetch queue, or the like.

The decoder circuit may judge whether or not the decode instruction is a target instruction based on at least one of the instruction code of the decode instruction and the target instruction modifying information register.

If the decode instruction is not the target instruction, the decoder circuit decodes the instruction so that a normal function of the instruction is realized.

The prefix instruction decoder circuit may perform decode processing only on the prefix instruction by reading each instruction stored in the instruction queue at least one clock cycle before each instruction is transferred to the decoder circuit. When the read instruction is the prefix instruction, the prefix instruction decoder circuit causes the target instruction modifying information register to store information necessary for decoding the target instruction modified by the prefix instruction at least before the target instruction to be modified by the prefix instruction is decoded.

If the instruction stored in the instruction queue is the prefix instruction, the prefix instruction decoder circuit controls so that the stored instruction is not decoded by the decoder circuit.

Therefore, the prefix instruction can be decoded by the prefix instruction decoder circuit during a period in which the preceding instruction is decoded by the decoder circuit, whereby information necessary for execution of the target instruction can be stored in the target instruction modifying information register. The prefix instruction can be realized substantially in zero clock cycles by decoding the target instruction by referring to the target instruction modifying information register, whereby an increase in processing speed of the data processing device can be achieved.

Moreover, since the circuit scale of the prefix instruction decoder circuit is significantly smaller than that of the ordinary decoder circuit, an increase in processing speed of the data processing device can be achieved without increasing the circuit scale.

(2) In this data processing device, the given prefix instruction may include an immediate-data expansion prefix instruction for expanding immediate data necessary for execution of the target instruction, function of which is expanded by the prefix instruction, the prefix instruction decoder circuit may cause the target instruction modifying information register to store immediate-data expansion information necessary for expanding the immediate data during execution of the target instruction modified by the immediate-data expansion prefix instruction when the input instruction code is the immediate-data expansion prefix instruction, and the decoder circuit may decode the decode instruction so that the immediate data is expanded at the time of execution of the target instruction that has been modified by the immediate-data expansion prefix instruction based on the immediate-data expansion information stored in the target instruction modifying information register when the decode instruction is the target instruction of the immediate-data expansion prefix instruction.

The immediate-data expansion information necessary for expanding the immediate data when the target instruction is executed includes values for some of the bits of the immediate data necessary for execution (values for bits corresponding to the expanded portion), for example.

The expansion of immediate data used herein not only includes zero extension and sign extension, but also includes a case of expanding a bit width of the immediate data described in the instruction code and adding given bits to the expanded portion.

According to this data processing device, the immediate-data expansion prefix instruction which expands the immediate data necessary for execution of the target instruction can be realized substantially in zero clock cycles without increasing the circuit scale, whereby an increase in processing speed of the data processing device can be achieved.

(3) In this data processing device, the given prefix instruction may include a shift prefix instruction for shifting an execution result of the target instruction, function of which is expanded by the prefix instruction, the prefix instruction decoder circuit may cause the target instruction modifying information register to store shift information necessary for shifting the execution results of the target instruction modified by the shift prefix instruction when the input instruction code is the shift prefix instruction, and the decoder circuit may decode the decode instruction so that the execution result of the target instruction modified by the shift prefix instruction are shifted based on the shift information stored in the target instruction modifying information register for execution of the target instruction when the decode instruction is the target instruction of the shift prefix instruction.

The shift information necessary for shifting the execution results of the target instruction includes information on whether to shift the execution results of the target instruction to the left or the right, information on whether to shift the execution results logically or arithmetically, and the number of shifts (shift value), for example.

According to this data processing device, the shift prefix instruction which shifts the execution results of the target instruction can be realized substantially in zero clock cycles without increasing the circuit scale, whereby an increase in processing speed of the data processing device can be achieved.

(4) In this data processing device, the given prefix instruction may include a register expansion prefix instruction for expanding a register necessary for execution of the target instruction, function of which is expanded by the prefix instruction, the prefix instruction decoder circuit may cause the target instruction modifying information register to store register expansion information necessary for expanding the register during execution of the target instruction modified by the register expansion prefix instruction when the input instruction code is the register expansion prefix instruction, and the decoder circuit may decode the decode instruction so that the register is expanded at a time of execution of the target instruction that has been modified by the register expansion prefix instruction based on the register expansion information stored in the target instruction modifying information register when the decode instruction is the target instruction of the register expansion prefix instruction.

The register expansion information necessary for expanding the register during execution of the target instruction includes information on a general-purpose register number used during execution of the target instruction, for example.

According to this data processing device, the register expansion prefix instruction which expands the register necessary for execution of the target instruction can be realized substantially in zero clock cycles without increasing the circuit scale, whereby an increase in processing speed of the data processing device can be achieved.

(5) In this data processing device, the given prefix instruction may include an execution control prefix instruction for controlling whether or not to execute the target instruction, function of which is expanded by the prefix instruction, the prefix instruction decoder circuit may cause the target instruction modifying information register to store execution control information necessary for controlling whether or not to execute the target instruction modified by the execution control prefix instruction when the input instruction code is the execution control prefix instruction, and the decoder circuit may decode the decode instruction so that the target instruction modified by the execution control prefix instruction is executed by judging whether or not to execute the target instruction based on the execution control information stored in the target instruction modifying information register when the decode instruction is the target instruction of the execution control prefix instruction.

In the case of controlling whether or not to execute the target instruction by comparison results of a compare instruction executed before the execution control prefix instruction, the execution control information necessary for controlling whether or not to execute the target instruction may be comparison results corresponding to whether or not to execute the target instruction, for example.

The target instruction may be replaced with an NOP instruction when the comparison results of the compare instruction coincide with a defined comparison code.

According to this data processing device, the execution control prefix instruction for controlling whether or not to execute the target instruction can be realized substantially in zero clock cycles without increasing the circuit scale, whereby an increase in processing speed of the data processing device can be achieved.

(6) In this data processing device, the fetch circuit may be connected with a bus having a width at least twice the width of the instruction code, and may fetch the instructions in the instruction queues through the bus in one clock cycle.

(7) In this data processing device, the target instruction may be located subsequent to the prefix instruction which modifies the target instruction, and the prefix instruction decoder circuit may perform decode processing only on the prefix instruction for a second instruction subsequent to a first instruction during a period in which the decoder circuit decodes the first instruction.

(8) Electronic equipment according to another embodiment of the present invention comprises the above data processing device, means which receives input information; and means which outputs a result processed by the data processing device based on the input information.

According to the present invention, high-function electronic equipment can be provided at low cost since the electronic equipment is equipped with an inexpensive data processing device capable of operating at high speed.

A preferred embodiment of the present invention is described below in detail with reference to the drawings.

1. Data Processing Device

FIG. 1 is a view illustrating an example of pipeline control in a conventional microcomputer (data processing device in a broad sense).

FIG. 1 shows a timetable in which instructions i to iv are processed in a microcomputer which performs five stages of pipeline control consisting of Fetch (F), Decode (D), Execute (E), Access (A), and Write (W).

The instructions ii ext and iii ext are prefix instructions which modify the subsequent instruction iv. Specifically, the instruction iv add is a target instruction which is modified by the instructions ii ext and iii ext.

In the case of executing four instructions including a prefix instruction and a target instruction in a microcomputer which performs pipeline control, four clock cycles are needed as shown in the timetable in FIG. 1.

Figure 2B:
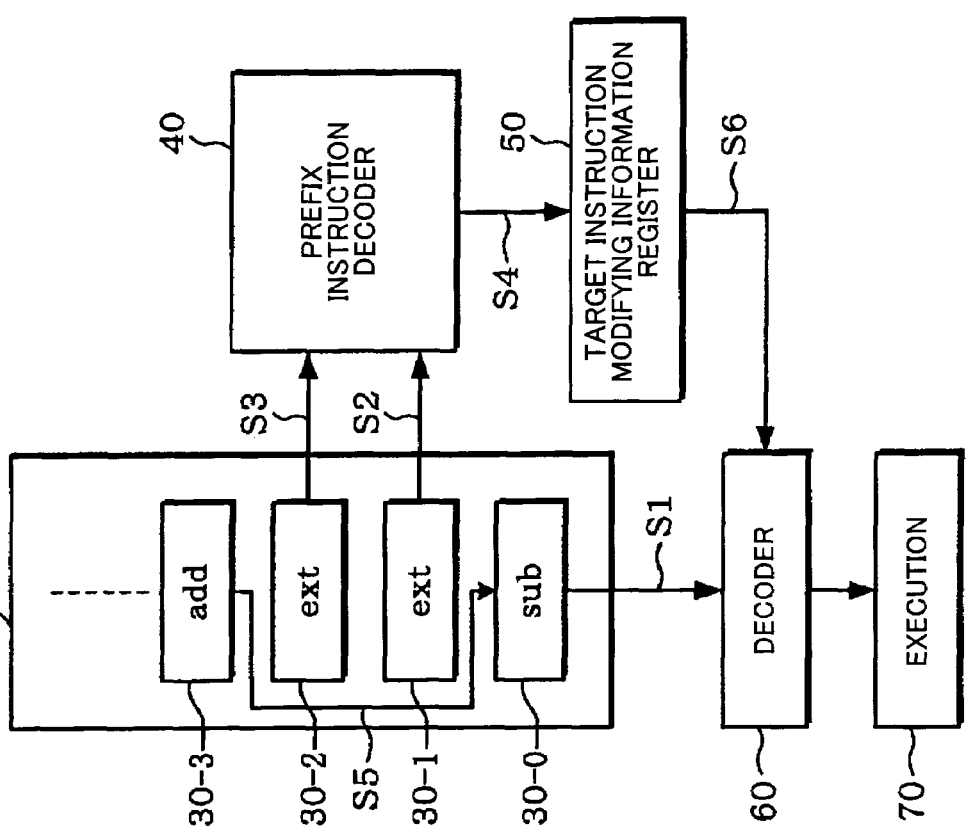
FIGS. 2A and 2B are views illustrating characteristics of an embodiment of the present invention.
Figure 2A:
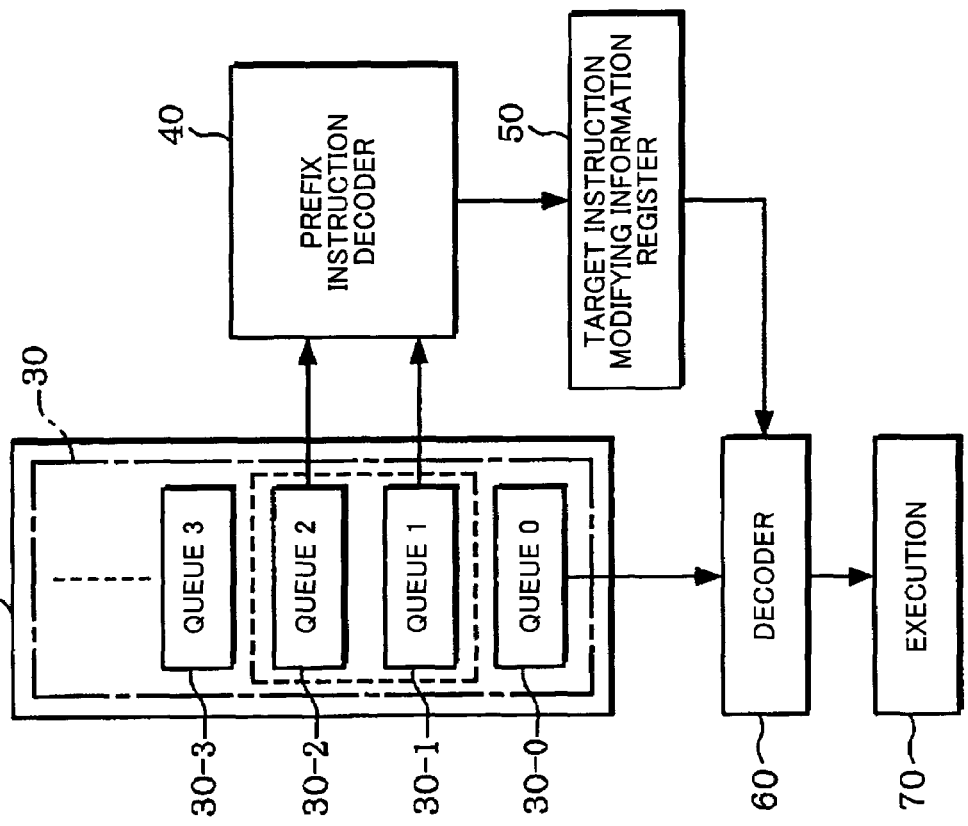

FIGS. 2A and 2B are views illustrating characteristics of the present embodiment. FIG. 2A is a view illustrating a characteristic configuration of a data processing device of the present embodiment. The data processing device of the present embodiment includes a fetch circuit 20 which fetches instruction codes of a plurality of instructions in instruction queues (prefetch queues) 30-0, 30-1; . . . , a prefix instruction decoder circuit 40 which performs a decode processing only on a prefix instruction, the instruction decoder circuit 40 receiving the instruction codes of the instructions before decoding that are fetched in the instruction queues 30 (instruction code stored in queue 1 (30-1) and instruction code stored in queue 2 (30-2) in FIG. 2A), judging whether or not the instruction is a given prefix instruction and causing a target instruction modifying information register 50 to store information necessary for decoding a target instruction modified by the prefix instruction if the instructions are the given prefix instructions; a decoder circuit 60 which receives the instruction code fetched in the instruction queues 30 other than the prefix instruction and decodes the instruction code; and an execution circuit 70 which executes the decoded instruction.

FIG. 2B is a view illustrating a characteristic operation of the data processing device of the present embodiment.

The following description is given on the assumption that the instructions i to iv (sub, ext, ext, and add) shown in FIG. 1 are stored in the instruction queues 30-0, 30-1, . . .

The first instruction (sub) stored in the instruction queue 0 (30-0) is transferred to the decoder circuit 60 (S1), and the second instruction (ext) stored in the instruction queue 1 (30-1) and the third instruction (ext) stored in the instruction queue 2 (30-2) are input to the prefix instruction decoder circuit 40 (S2 and S3). The prefix instruction decoder circuit 40 performs the decode processing only on a prefix instruction of the second instruction (ext) and the third instruction (ext) subsequent to the first instruction during a period in which the decoder circuit 60 decodes the first instruction (sub).

Since the second instruction (ext) and the third instruction (ext) are prefix instructions, information necessary for decoding the target instruction modified by the prefix instructions is stored in the target instruction modifying information register 50 (S4).

The second instruction (ext) stored in the instruction queue 1 (30-1) and the third instruction (ext) stored in the instruction queue 2 (30-2) are not transferred to the decoder circuit since these instructions are prefix instructions. The fourth instruction (add) stored in the instruction queue 3 (30-3) is transferred to the decoder circuit 60 (S5). The information stored in the target instruction modifying information register 50 is input to the decoder circuit (S6), and the decoder circuit decodes the fourth instruction (add) so that the fourth instruction is executed as the target instruction modified by the prefix instructions.

This enables the prefix instruction to be executed substantially in zero clock cycles.

The above description illustrates the case where the prefix instruction decoder circuit performs the decode processing only on a prefix instruction of the second instruction and the third instruction respectively stored in the queue 1 (30-1) and the queue 2 (30-2) during a period in which the decoder circuit 60 decodes the first instruction stored in the queue 0 (30-0). However, the present invention is not limited thereto.

In the case where the number of prefix instructions which modify one target instruction is one, the prefix instruction decoder circuit may perform the decode processing only on a prefix instruction for the second instruction during a period in which the decoder circuit decodes the first instruction.

In the case where the number of prefix instructions which modify one target instruction is n, the prefix instruction decoder circuit may perform the decode processing only on a prefix instruction for the second to (n+1)th instructions during a period in which the decoder circuit decodes the first instruction.

Figure 3:
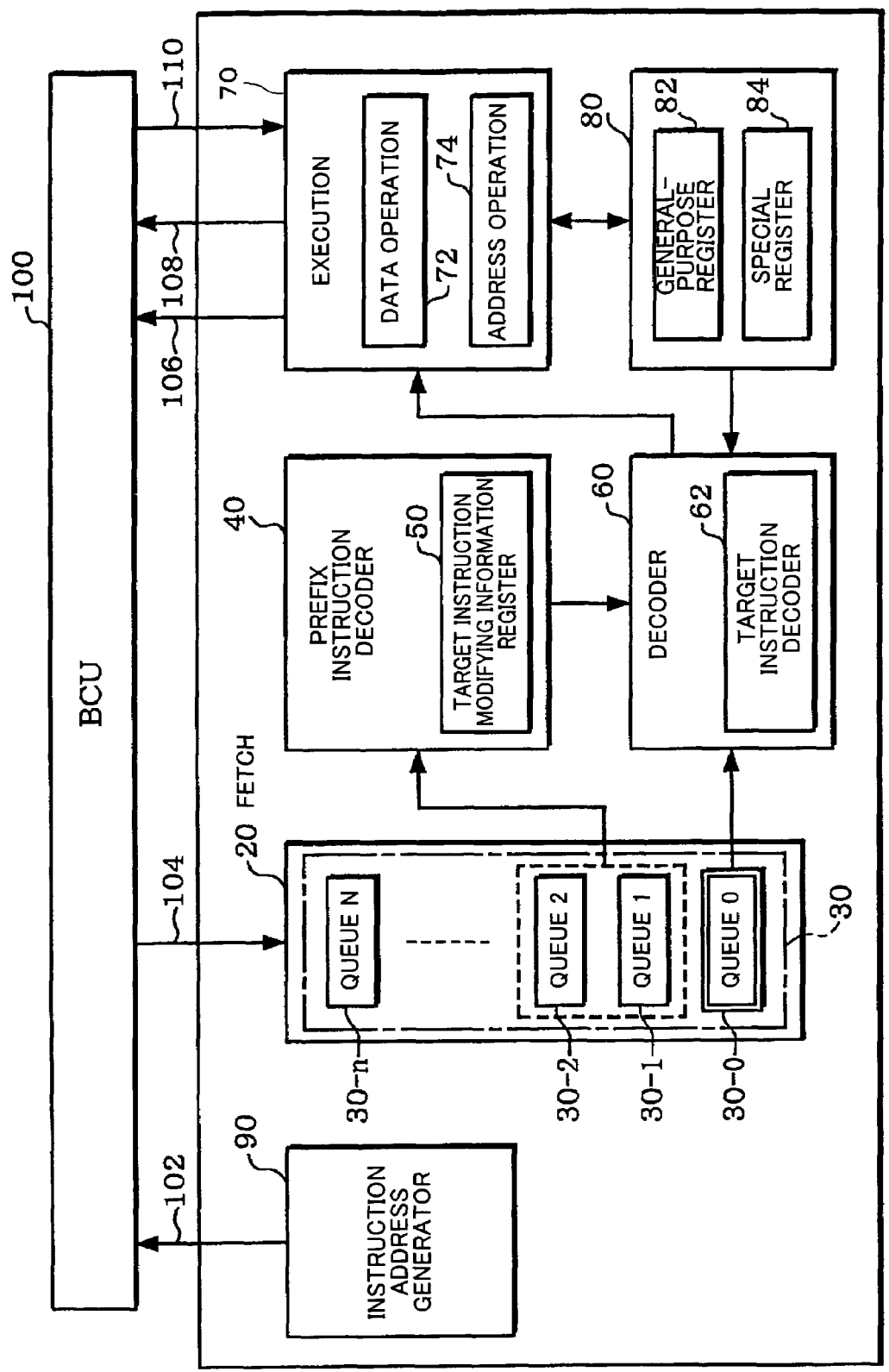
FIG. 3 is a functional block diagram illustrating a configuration of a microcomputer (data processing device in a broad sense) of an embodiment of the present invention.

FIG. 3 is a functional block diagram illustrating a configuration of a microcomputer (data processing device in a broad sense) of the present embodiment.

A microcomputer of the present embodiment includes a CPU (processing circuit in a broad sense) 10 and a BCU (bus control unit) 100. The microcomputer may also include various types of peripheral circuits such as a ROM (Read Only Memory), RAM (Random Access Memory), MMU (Memory Management Unit), DMAC (Direct Access Memory Controller), LCD (Liquid Crystal Display) driver, and S10 (Serial Input Output).

The CPU 10 performs pipeline control for instruction fetching, instruction decoding, operation processing, writing into registers, and the like according to a program stored in a ROM or RAM. The CPU 10 handles 32-bit width data, but processes 16-bit instruction codes.

The BCU 100 controls various types of buses such as a 32-bit instruction data bus, an instruction address bus for instruction data access, a 32-bit data bus, a data address bus for data access, and a control bus for control signals (not shown).

The CPU 10 exchanges signals with the outside through these various types of buses.

The CPU 10 includes the fetch circuit 20, the prefix instruction decoder circuit 40, the decoder circuit 60, the execution circuit 70, a register file 80 (general-purpose register 82 and special register 84), an instruction address generator 90, and the like.

The fetch circuit 20 prefetches instruction codes of a plurality of instructions including a given target instruction and a prefix instruction which precedes the target instruction and modifies the function of the target instruction in the instruction queues (prefetch queue, for example) 30-0, 30-1, . . .

The prefix instruction decoder circuit 40 is connected with given instruction queues (30-1 and 30-2) through a signal line. The prefix instruction decoder circuit 40 allows the instruction code before decoding fetched in the given instruction queue to be input thereto, judges whether or not the input instruction code is a given prefix instruction, and, if the instruction code is the given prefix instruction, causes the target instruction modifying information register 50 to store information necessary for decoding the target instruction modified by the prefix instruction.

The decoder circuit 60 is connected with the instruction queue through a signal line, allows the instruction code fetched in the instruction queue other than the prefix instruction to be input thereto, and decodes the input instruction code.

The decoder circuit includes a target instruction decoder circuit 62 which is connected with the target instruction modifying information register 50 through a signal line, allows the target instruction modifying information stored in the target instruction modifying information register 50 to be input thereto, and decodes the target instruction modified by the prefix instruction.

The execution circuit 70 executes the instruction based on operation contents of the instruction decoded by the decoder circuit 60. The execution circuit 70 includes a data operation circuit 72 which calculates data and an address operation circuit 74 which calculates an address, and executes a function of the instruction decoded by the decoder circuit 60 while optionally accessing the general-purpose register 84 or a memory (RAM or the like).

The register file 90 includes registers used by the CPU, such as 16 general-purpose registers R0 to R15, a program counter (PC), a processor status register (PSR), a stack pointer (SP), an arithmetic low register (ALR), and an arithmetic high register (AHR).

The instruction address generator 90 generates an instruction address to be fetched in the instruction queue based on a program counter (not shown) and the like.

Figure 4:
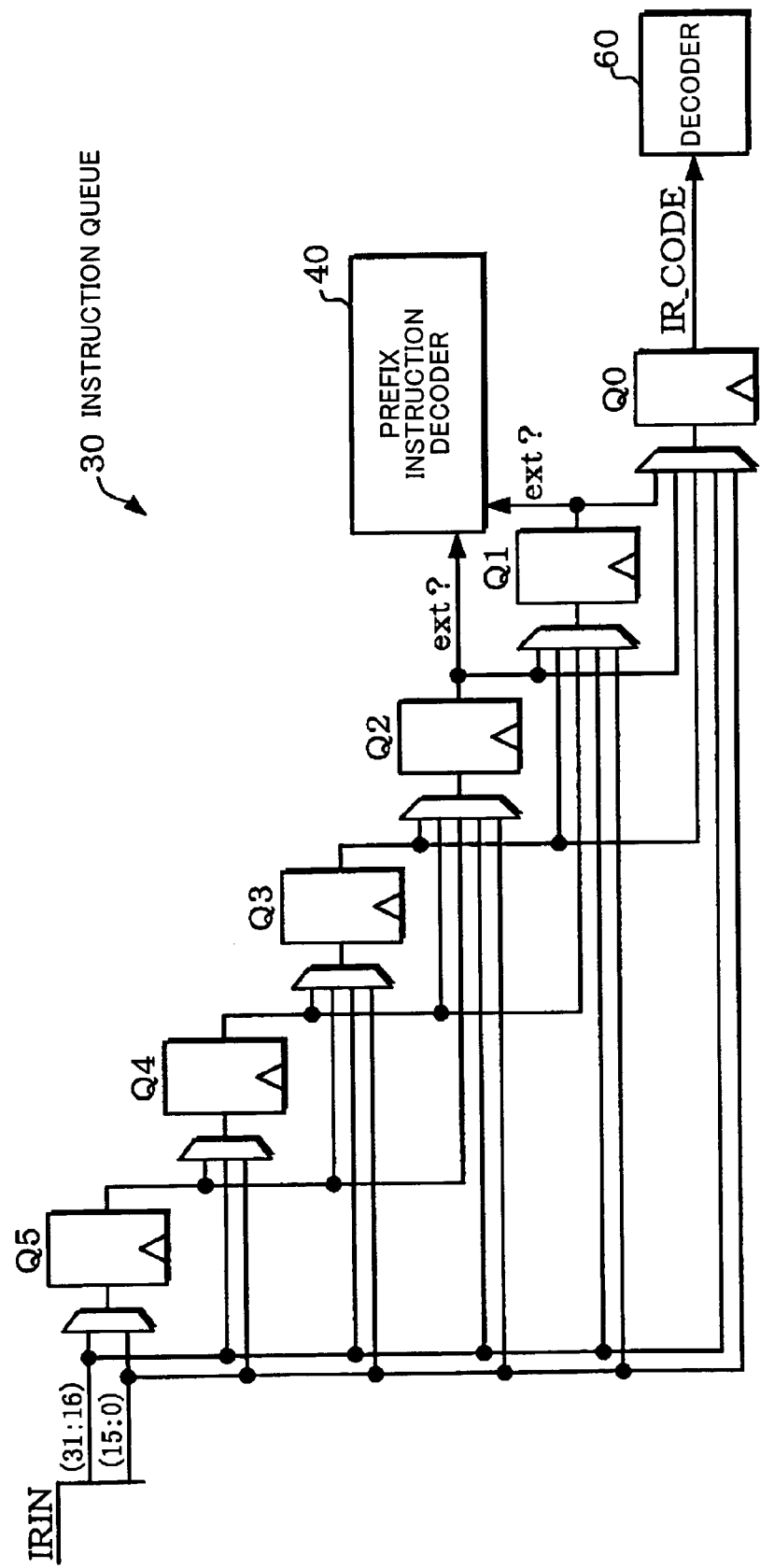
FIG. 4 is a view illustrating an example of a specific circuit configuration of instruction queues of a fetch circuit.

FIG. 4 is a view illustrating an example of a specific circuit configuration of the instruction queue of the fetch circuit.

The fetch circuit receives instruction codes stored in a ROM or RAM through a bus (not shown) and a signal line IRIN. A case where the instruction length is 16 bits and 32-bit data is transferred is described below.

The instruction queue has six instruction queues Q0 to Q5 so that six instruction codes can be fetched.

The fetch circuit divides the read 32-bit data into a bit (31:16) portion and a bit (15:0) portion, and sequentially stores the data in the instruction queues Q0 to Q5 so that the stored data is sequentially decoded and executed. The fetch circuit may sequentially refer to whether or not the instruction queues Q0 to Q5 can be used, and store the instruction read therein in the available queue.

The fetch circuit controls so that output of the instruction queue Q0 is input to the decoder circuit in each clock cycle and output of the instruction queues Q1 and Q2 is input to the prefix instruction decoder circuit at the same timing.

If the prefix instruction decoder circuit 40 judges that the instructions stored in the instruction queues Q1 and Q2 are given prefix instructions, the fetch circuit controls so that these instructions are not input to the decoder circuit. If the instructions stored in the instruction queues Q1 and Q2 are given prefix instructions, the fetch circuit may control so that these instructions are not input to the decoder circuit by storing the instruction stored in the instruction queue Q3 in the instruction queue Q0 instead of the instructions stored in the instruction queues Q1 and Q2.

The fetch circuit controls so that the instructions stored in the instruction queues Q5 to Q3 are stored in the instruction queue Q0 through either the instruction queue Q1 or the instruction queue Q2. This enables the prefix instruction decoder circuit 40 to judge whether or not each instruction is a prefix instruction, and performs decoding processing only relating to the prefix instruction on the judged instruction if the judged instruction is the prefix instruction.

The above example is described taking a circuit configuration in which the fetch circuit is connected with the bus having a width twice the width of the instruction code, and two instructions can be fetched in one clock cycle as an example. However, the present invention is not limited thereto.

For example, the fetch circuit may be connected with a bus having a width three times or more the width of the instruction code, and three or more instructions may be fetched in the instruction queue through the bus in one clock cycle.

2. Immediate-data Expansion Prefix Instruction

Figure 5A:
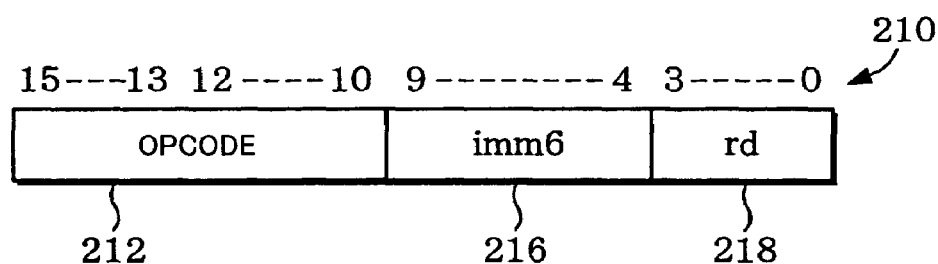
FIGS. 5A and 5B are views illustrating an immediate-data expansion prefix instruction and a target instruction of the immediate-data expansion prefix instruction.
Figure 5B:
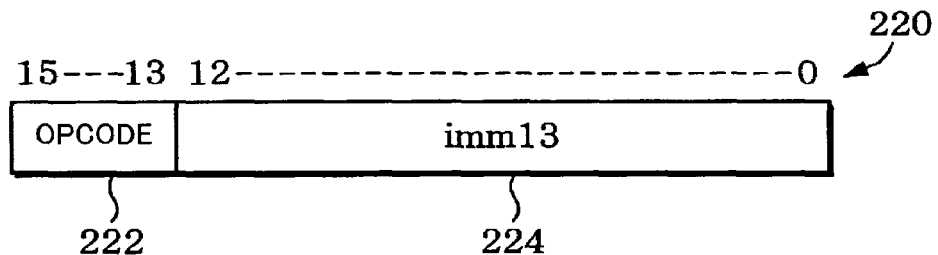

FIG. 5A is a view showing a bit field of an instruction code 210 of an instruction which can become a target instruction of an immediate-data expansion prefix instruction. FIG. 5B shows a bit field of an instruction code 220 of an ext instruction (immediate-data expansion prefix instruction). The numerals on the upper side of the bit field indicate the bit positions. As shown in FIGS. 5A and 5B, the instruction code has a 16-bit wide field from the bit 15 to the bit 0.

The instruction code 210 of the instruction which can become a target instruction of the immediate-data expansion prefix instruction shown in FIG. 5A includes a 6-bit operation code (opcode) designation region 212 from the bit 15 to the bit 10, a 6-bit immediate-data designation region 216 from the bit 9 to the bit 4, and a 4-bit register designation region 218 from the bit 3 to the bit 0.

An opcode which specifies contents of the operation is stored in the opcode designation region 212.

The value of 6-bit immediate data (imm6) is stored in the immediate-data designation region 216. A code indicating one of the general-purpose registers (rd) is stored in the register designation region 218.

An instruction which can become a target instruction of the immediate-data expansion prefix instruction is an instruction for performing an operation indicated by the opcode on the immediate data (imm6) and the general-purpose register (rd), and writing the operation results in the general-purpose register (rd).

As shown in FIG. 5B, the instruction code 220 of the ext instruction (immediate-data expansion prefix instruction) includes a 3-bit opcode designation region 222 from the bit 15 to the bit 13, and a 13-bit immediate-data designation region 224 from the bit 12 to the bit 0.

An opcode which indicates that the instruction is an immediate-data expansion prefix instruction is stored in the opcode designation region 222.

The value of 13-bit immediate data (imm13) is stored in the immediate-data designation region 224.

Since the ext instruction is a prefix instruction, the ext instruction does not independently allow ALU operations and the like to be executed in the CPU. The ext instruction has a function of expanding immediate data used for execution of the subsequent target instruction when the target instruction is executed. In the case where an instruction including immediate data in the instruction code, such as the instruction shown in FIG. 5A, becomes a target instruction of the ext instruction, the ext instruction has a function of expanding the immediate data included in the instruction code of the target instruction by using the 13-bit immediate data (imm13) of the ext instruction when the target instruction is executed.

Execution contents in the case where a type-1 instruction is independently executed are described below. In FIG. 3, the type-1 instruction is retrieved from a ROM (not shown) through an instruction data bus (not shown), and is stored in the instruction register queue 30 by the fetch circuit 20. The prefix instruction decoder circuit 40 judges whether or not the type-1 instruction is a prefix instruction.

Since the type-1 instruction is not a prefix instruction, the type-1 instruction is input to the decoder circuit 60 and decoded therein. Since the decode instruction is not a target instruction, the instruction is decoded for a normal function (function which is not expanded by a prefix instruction), and executed according to a normal function.

Specifically, data stored in the general-purpose register (rd) designated by the instruction code is input to the ALU (data operation circuit 72) from the register file 80. The immediate data (imm6) designated by the instruction code is detached by the decoder circuit, and is expanded to 32 bits by means of zero extension or sign extension by an immediate-data generating circuit 170 (not shown). The expanded immediate data is input to the ALU (data operation circuit 72). The ALU (data operation circuit 72) performs an operation indicated by the opcode of the type-1 instruction, and stores the operation results in the general-purpose register (rd) of the register file 80.

An instruction which can become a target instruction of the immediate-data expansion prefix instruction may be executed independently, or may be executed in combination with one or more preceding ext instructions. In the case where the instruction is executed in combination with the ext instruction, the ext instruction stored in the instruction queue is decoded by the prefix instruction decoder circuit (see 40 in FIG. 3). The immediate data (imm13 in FIG. 5B) designated in the instruction code is detached by the prefix instruction decoder circuit, and is stored in the target instruction modifying information register 50.

The target instruction subsequent to the ext instruction is input to the decoder circuit. The immediate data imm6 is expanded by a target instruction function expansion circuit (see 62 in FIG. 3) by using the immediate data of the preceding ext instruction held in the target instruction modifying information register (see 50 in FIG. 3).

Therefore, the resulting expanded immediate data differs depending on whether the instruction which can become a target instruction of the immediate-data expansion prefix instruction is executed independently or executed in combination with one or more preceding ext instructions.

Figure 6A:
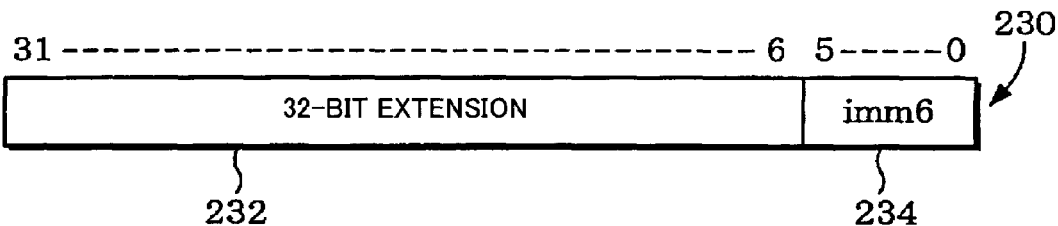
FIGS. 6A to 6C are views showing expressions which indicate operations of type-1 instructions and fields of expanded immediate data used for execution of the operations.
Figure 6B:
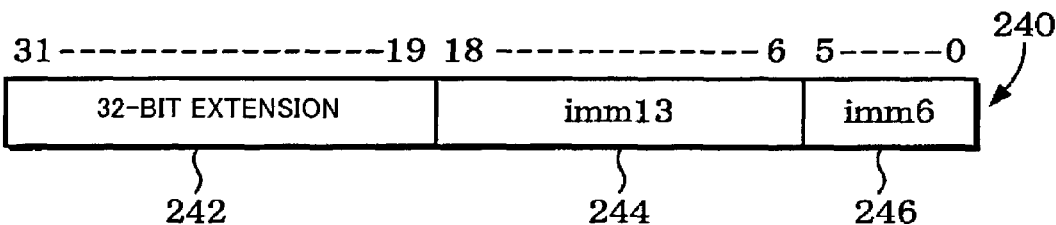
Figure 6C:
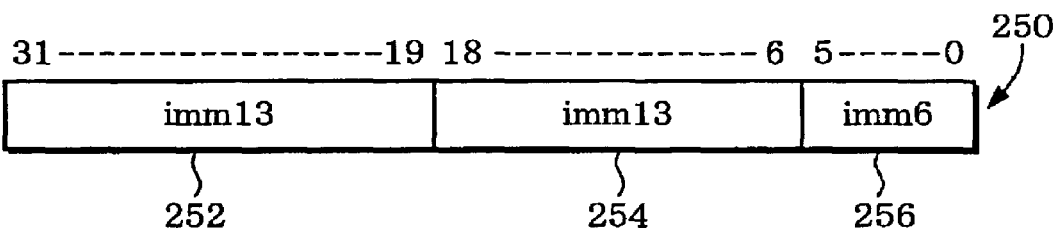

FIGS. 6A to 6C are views showing expressions which indicate operations of the type-1 instruction and fields of expanded immediate data used for execution of the operations.

FIG. 6A is a view showing an expression which indicates an operation in the case where an instruction which can become a target instruction of the immediate-data expansion prefix instruction is independently executed and a bit field of expanded immediate data 230 used for execution of the operation. As shown in FIG. 6A, 6-bit immediate data (imm6) of a type-1 instruction is expanded by means of zero extension or sign extension to make up the 32-bit immediate data 230. In the case where the immediate data is zero-extended, the bit 6 to the bit 31 in a region 232 are all zero. In the case where the immediate data is sign-extended, the bit 6 to the bit 31 in the region 232 are the same as the most significant bit (bit 5) of the immediate data imm6.

FIG. 6B is a view showing an expression which indicates an operation in the case where the instruction is executed in combination with one preceding ext instruction, and a bit field of expanded immediate data 240 used for execution of the operation. As shown in FIG. 6B, 6-bit immediate data (imm6) of the instruction which can become a target instruction of the immediate-data expansion prefix instruction is set in a field 246 from the bit 5 to the bit 0, and 13-bit immediate data (imm13) of one preceding ext instruction is set from the bit 18 to the bit 6, whereby 19-bit immediate data (imm19) is generated. The 19-bit immediate data (imm19) is expanded by means of zero extension or sign extension to make up the 32-bit immediate data 240. In the case where the immediate data is zero-extended, the bit 19 to the bit 31 in a region 242 are all zero. In the case where the immediate data is sign-extended, the bit 19 to the bit 31 in the region 242 are the same as the most significant bit (bit 18) of the immediate data imm19.

FIG. 6C is a view showing an expression which indicates an operation in the case where the instruction is executed in combination with two preceding ext instructions, and a bit field of expanded immediate data 250 used for execution of the operation. As shown in FIG. 6C, 6-bit immediate data (imm6) of the instruction which can become a target instruction of the immediate-data expansion prefix instruction is set in a field 256 from the bit 5 to the bit 0, 13-bit immediate data (imm13) of the first ext instruction is set from the bit 31 to the bit 19, and 13-bit immediate data (imm13) of the second ext instruction is set from the bit 18 to the bit 6, whereby 32-bit immediate data (imm32) 250 is generated.

Figure 7:
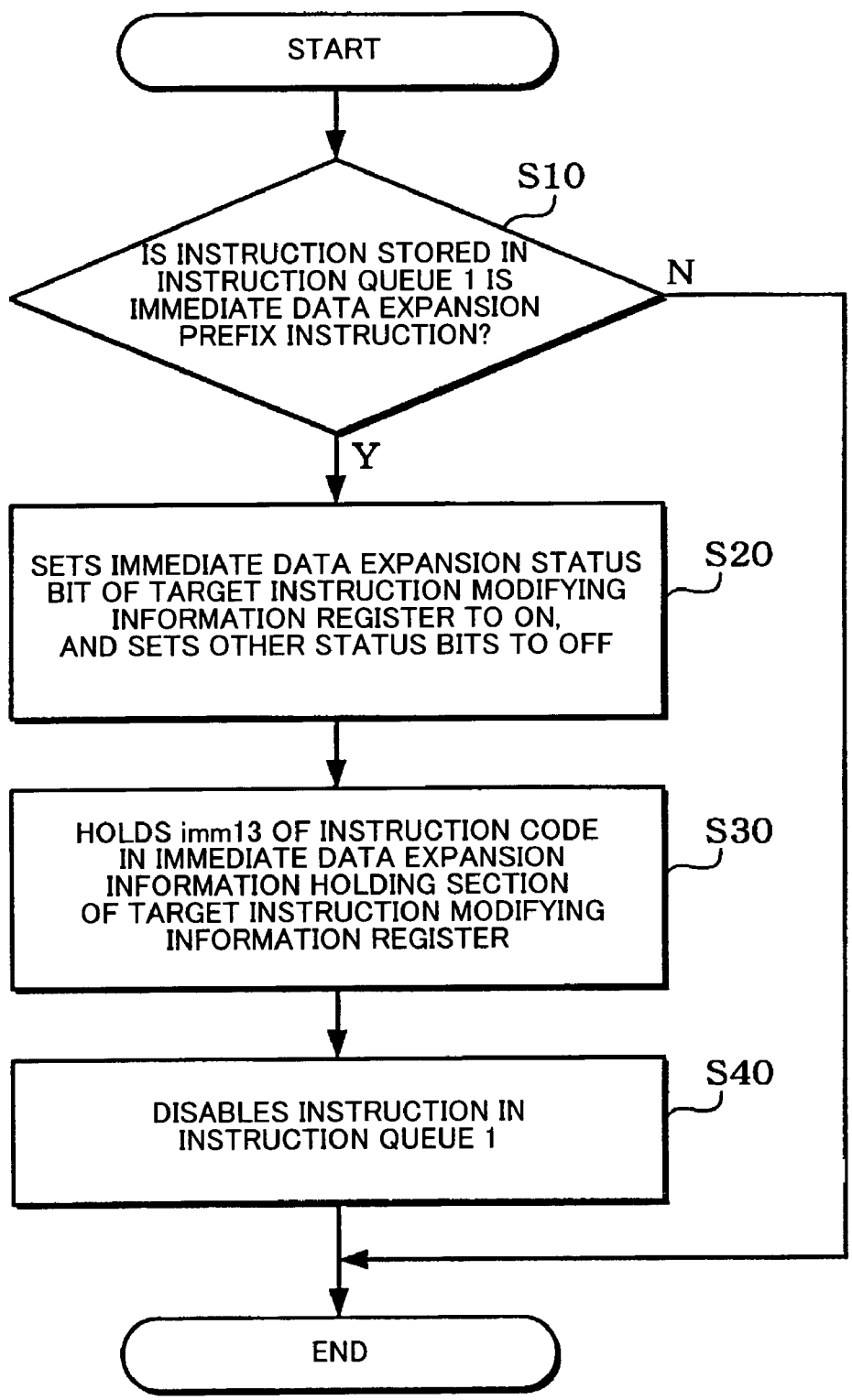
FIG. 7 is a flowchart illustrating process flow in which a prefix instruction decoder circuit decodes an instruction in an instruction queue in the case where a prefix instruction is an immediate-data expansion prefix instruction.

FIG. 7 is a flowchart illustrating process flow in which the prefix instruction decoder circuit decodes the instruction in the instruction queue in the case where the prefix instruction is the immediate-data expansion prefix instruction.

The prefix instruction decoder circuit judges whether or not the instruction stored in the instruction queue 1 is an immediate-data expansion prefix instruction, and performs the following processing if the instruction is the immediate-data expansion prefix instruction (step S10).

The prefix instruction decoder circuit sets the immediate-data expansion status bit of the target instruction modifying information register to ON, and sets other status bits to OFF (step S20).

The prefix instruction decoder circuit holds the immediate data imm13 in the instruction code in an immediate-data expansion information storing section of the target instruction modifying information register (step S30).

The prefix instruction decoder circuit then disables the instruction in the instruction queue 1 (step S40). The step of disabling the instruction in the instruction queue 1 includes processing necessary for controlling so that the instruction in the instruction queue 1 is not decoded by the decoder circuit.

Figure 8:
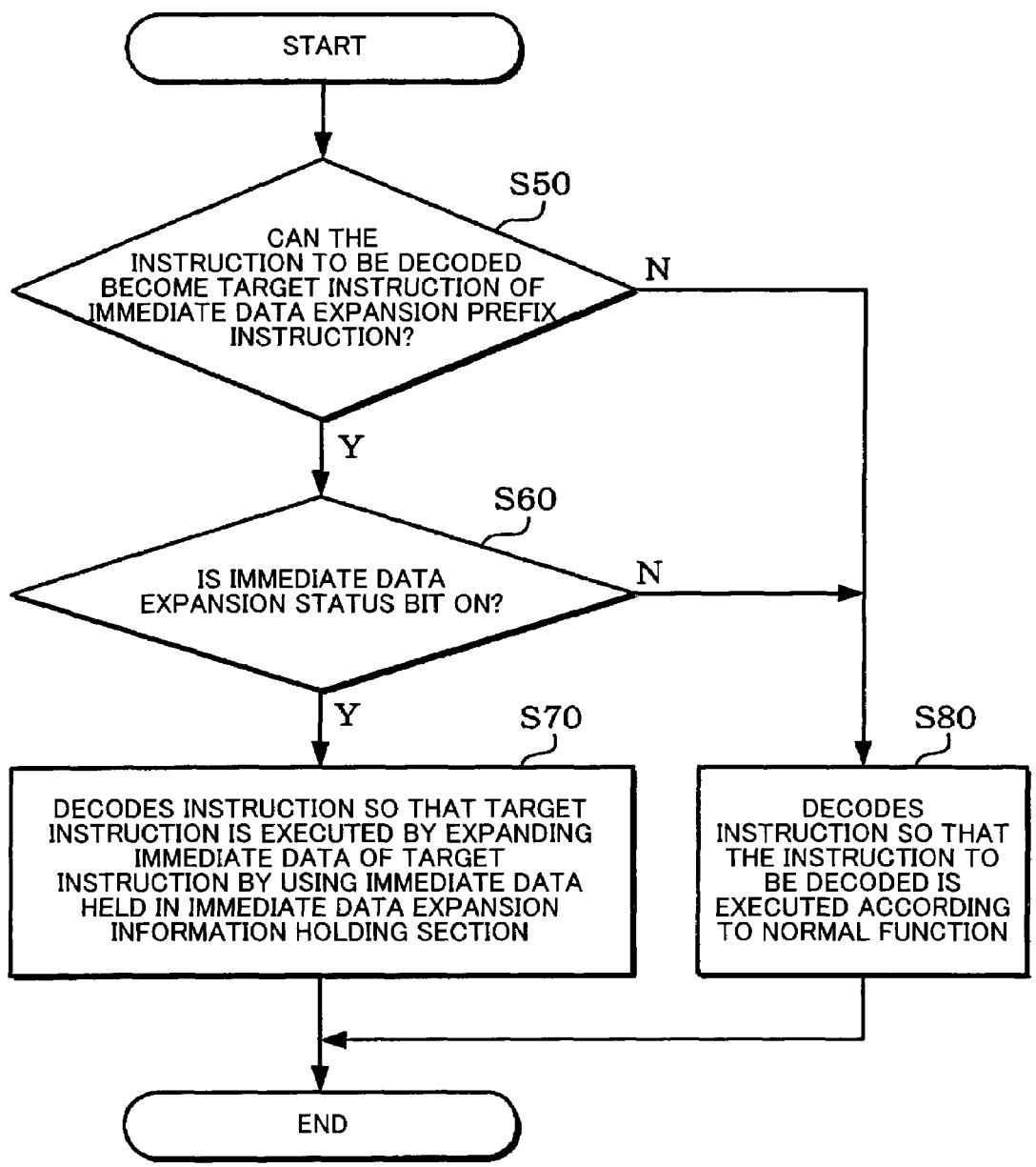
FIG. 8 is a flowchart illustrating process flow for decoding a decode instruction including a target instruction of an immediate-data expansion prefix instruction.

FIG. 8 is a flowchart illustrating process flow for decoding the decode instruction including a target instruction of the immediate-data expansion prefix instruction.

The decoder circuit judges whether or not the decode instruction can become a target instruction of the immediate-data expansion prefix instruction (step S50). In this case, since the instruction which can become a target instruction of the immediate-data expansion prefix instruction is specified in advance, it may be judged by comparing the instruction code of the decode instruction with the instruction code of the instruction which can become a target instruction of the immediate-data expansion prefix instruction which is specified in advance.

If the decode instruction can become a target instruction of the immediate-data expansion prefix instruction, the decoder circuit judges whether or not the immediate-data expansion status bit is ON (step S60).

If the immediate-data expansion status bit is ON, the decoder circuit decodes the instruction so that the target instruction is executed by expanding the immediate data of the target instruction by using the immediate data held in the immediate-data expansion information storing section (step S70).

If the decode instruction cannot become a target instruction of the immediate-data expansion prefix instruction, or if the immediate-data expansion status bit is OFF, the decoder circuit decodes the decode instruction so that the instruction is executed according to a normal function (step S80).

3. Shift Prefix Instruction

FIGS. 9A, 9B, and 9C are views illustrating a shift prefix instruction.

FIG. 9A is a view showing a bit field of an instruction code 310 of a shift prefix instruction.

As shown in FIG. 9A, the instruction code 310 of the shift prefix instruction includes an opcode designation region 312 from the bit 15 to the bit 4, shift left or shift right information 314 in the bit 3, logical shift or arithmetic shift information 316 in the bit 2, and shift value information 318 in the bits 1 and 0. The shift value can be designated in the shift value information 318 in the range of 1 to 4.

An opcode which indicates that the instruction is a shift prefix instruction is stored in the opcode designation region 312.

FIG. 9B is a view illustrating an operation in the case where an add instruction which can become a target instruction of the shift prefix instruction is independently executed. The case where the add instruction is independently executed refers to the case where the add instruction is executed without being allowed to become a target instruction of the shift prefix instruction. In this case, an operation in which the results obtained by adding "3" to the contents of a register 2 are stored in the register 2 is performed, as shown in FIG. 9B.

FIG. 9C is a view illustrating an operation in the case where the add instruction is executed as a target instruction of the shift prefix instruction.

The preceding ext instruction (shift prefix instruction) is a prefix instruction which directs to logically shift the execution results of the target instruction one bit to the right ("srl" and "1" of the operands respectively mean shift right logical and one bit shift).

In this case, an operation in which the results obtained by adding "3" to the contents of the register 2 are logically shifted one bit to the right and stored in the register 2 is performed according to the instruction of the preceding ext instruction (shift prefix instruction), as shown in FIG. 9C.

Figure 10:
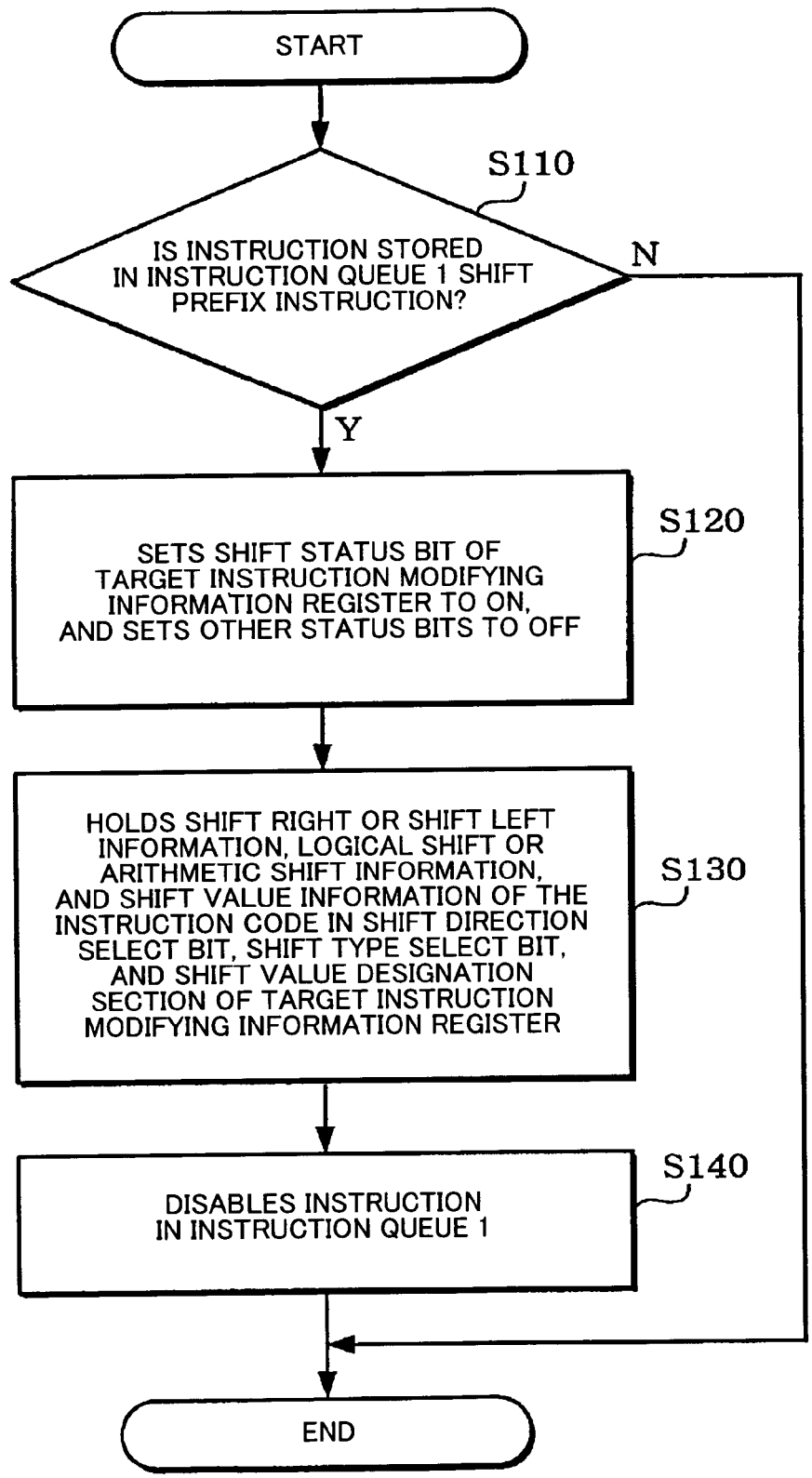
FIG. 10 is a flowchart illustrating process flow in which a prefix instruction decoder circuit decodes an instruction in an instruction queue in the case where a prefix instruction is a shift prefix instruction.

FIG. 10 is a flowchart illustrating process flow in which the prefix instruction decoder circuit decodes the instruction in the instruction queue in the case where the prefix instruction is the shift prefix instruction.

The prefix instruction decoder circuit judges whether or not the instruction stored in the instruction queue 1 is a shift prefix instruction, and performs the following processing if the instruction is a shift prefix instruction (step S110).

The prefix instruction decoder circuit sets a shift status bit of the target instruction modifying information register to ON, and sets other status bits to OFF (step S120).

The prefix instruction decoder circuit holds the shift right or shift left information, the logical shift or arithmetic shift information, and the shift value information of the instruction code respectively in a shift direction select bit, a shift type select bit, and a shift value designation section of the target instruction modifying information register (step S130).

The prefix instruction decoder circuit then disables the instruction in the instruction queue 1 (step S140). The step of disabling the instruction in the instruction queue 1 includes processing necessary for controlling so that the instruction in the instruction queue 1 is not decoded by the decoder circuit.

Figure 11:
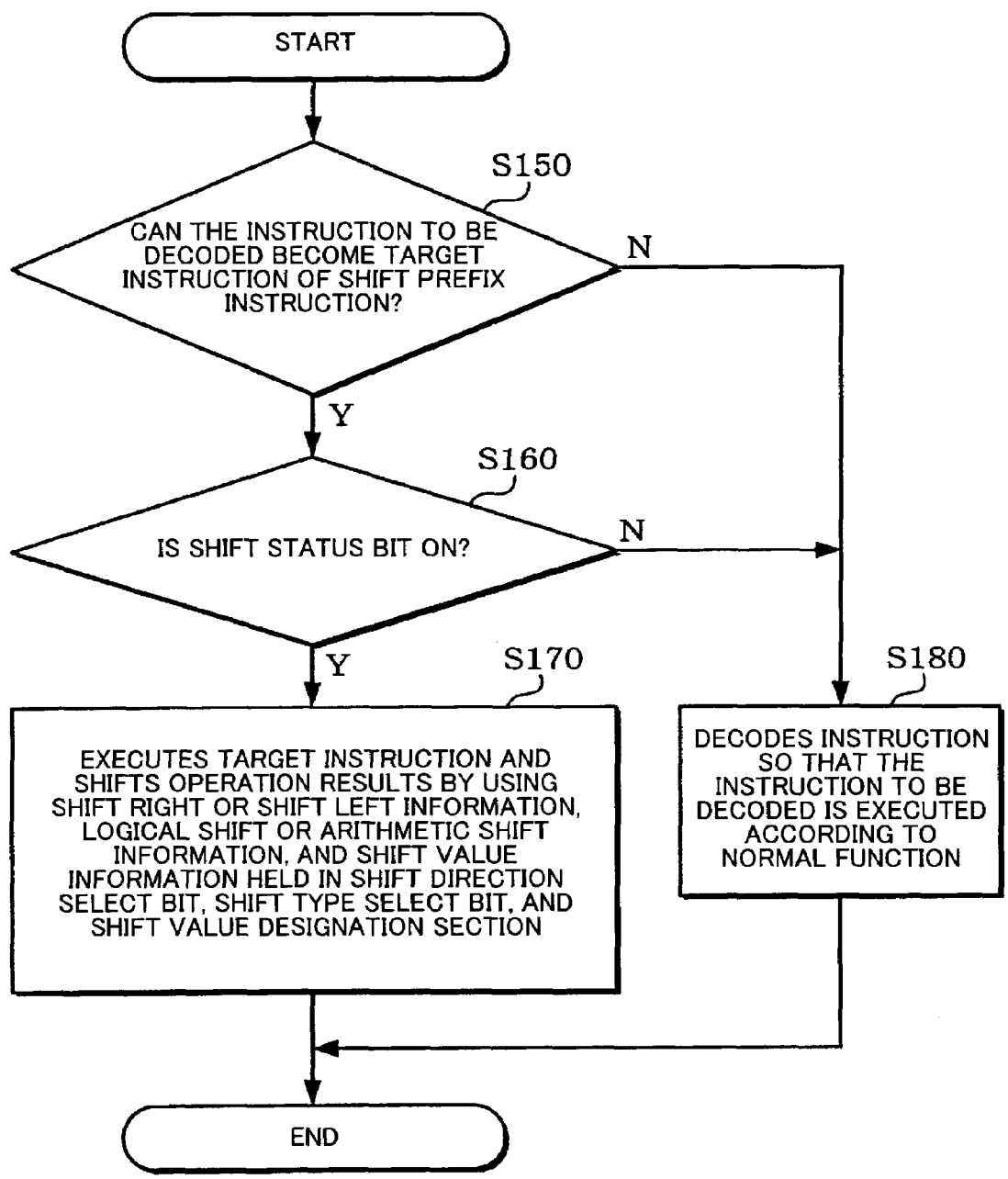
FIG. 11 is a flowchart illustrating process flow for decoding a decode instruction including a target instruction of a shift prefix instruction.

FIG. 11 is a flowchart illustrating process flow for decoding the decode instruction including a target instruction of the shift prefix instruction.

The decoder circuit judges whether or not the decode instruction can become a target instruction of the shift prefix instruction (step S150). In this case, since the instruction which can become a target instruction of the shift prefix instruction is specified in advance, it may be judged by comparing the instruction code of the decode instruction with the instruction code of the instruction which can become a target instruction of the shift prefix instruction which is specified in advance.

If the decode instruction can become a target instruction of the shift prefix instruction, the decoder circuit judges whether or not the shift status bit is ON (step S160).

If the shift status bit is ON, the target instruction is executed and the operation results are shifted by using the shift right or shift left information, the logical shift or arithmetic shift information, and the shift value information of the instruction code which are respectively held in the shift direction select bit, the shift type select bit, and the shift value designation section of the target instruction modifying information register (step S170).

If the decode instruction cannot become a target instruction of the shift prefix instruction, or if the shift status bit is OFF, the decoder circuit decodes the instruction so that the instruction is executed according to a normal function (step S180).

4. Register Expansion Prefix Instruction

Figures 12A, 12B, 12C:
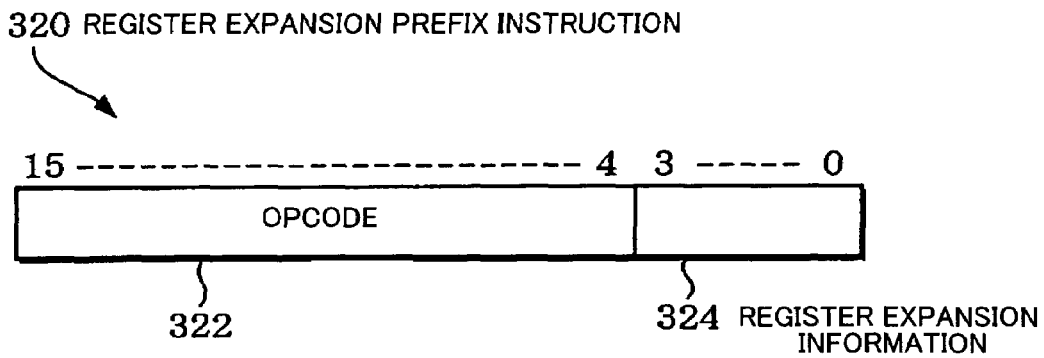
FIGS. 12A to 12C are views illustrating a register expansion prefix instruction.

FIGS. 12A, 12B, and 12C are views illustrating a register expansion prefix instruction.

FIG. 12A is a view showing a bit field of an instruction code of a register expansion prefix instruction. As shown in FIG. 12A, an instruction code 320 of the register expansion prefix instruction includes an opcode designation region 322 from the bit 15 to the bit 4, and register expansion information 324 from the bit 3 to the bit 0.

An opcode which indicates that the instruction is a register expansion prefix instruction is stored in the opcode designation region 322. A register number used as a register destination when a target instruction is executed is stored in the register expansion information 324.

FIG. 12B is a view illustrating an operation in the case where an add instruction which can become a target instruction of the register expansion prefix instruction is independently executed. The case where the add instruction is independently executed refers to the case where the add instruction is executed without being allowed to become a target instruction of the register expansion prefix instruction. In this case, an operation in which the results obtained by adding "3" to the contents of the register 2 are stored in the register 2 is performed, as shown in FIG. 12B.

FIG. 12C is a view illustrating an operation in the case where the add instruction is executed as a target instruction of the register expansion prefix instruction. In this case, an operation in which the results obtained by adding "3" to the contents of the register 2 are stored in the register 1 designated by the preceding ext instruction (register expansion prefix instruction) is performed, as shown in FIG. 12C.

Figure 13:
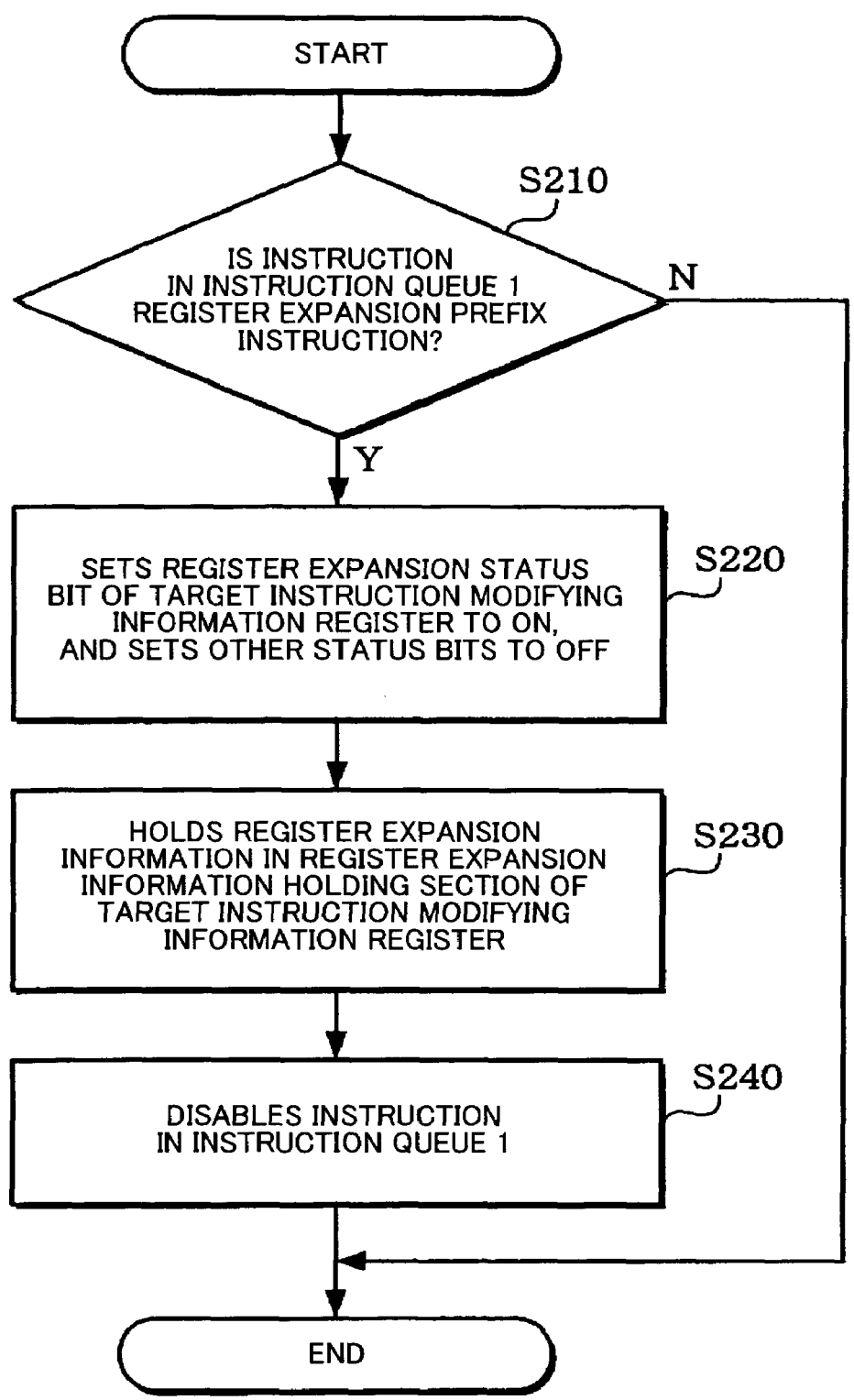
FIG. 13 is a flowchart illustrating process flow in which a prefix instruction decoder circuit decodes an instruction in an instruction queue in the case where a prefix instruction is a register expansion prefix instruction.

FIG. 13 is a flowchart illustrating process flow in which the prefix instruction decoder circuit decodes the instruction in the instruction queue in the case where the prefix instruction is a register expansion prefix instruction.

The prefix instruction decoder circuit judges whether or not the instruction stored in the instruction queue 1 is a register expansion prefix instruction, and performs the following processing if the instruction is a register expansion prefix instruction (step S210).

The prefix instruction decoder circuit sets a register expansion status bit of the target instruction modifying information register to ON, and sets other status bits to OFF (step S220).

The prefix instruction decoder circuit holds the register expansion information in a register expansion information storing section of the target instruction modifying information register based on the instruction code (step S230).

The prefix instruction decoder circuit then disables the instruction in the instruction queue 1 (step S240). The step of disabling the instruction in the instruction queue 1 includes processing necessary for controlling so that the instruction in the instruction queue 1 is not decoded by the decoder circuit.

Figure 14:
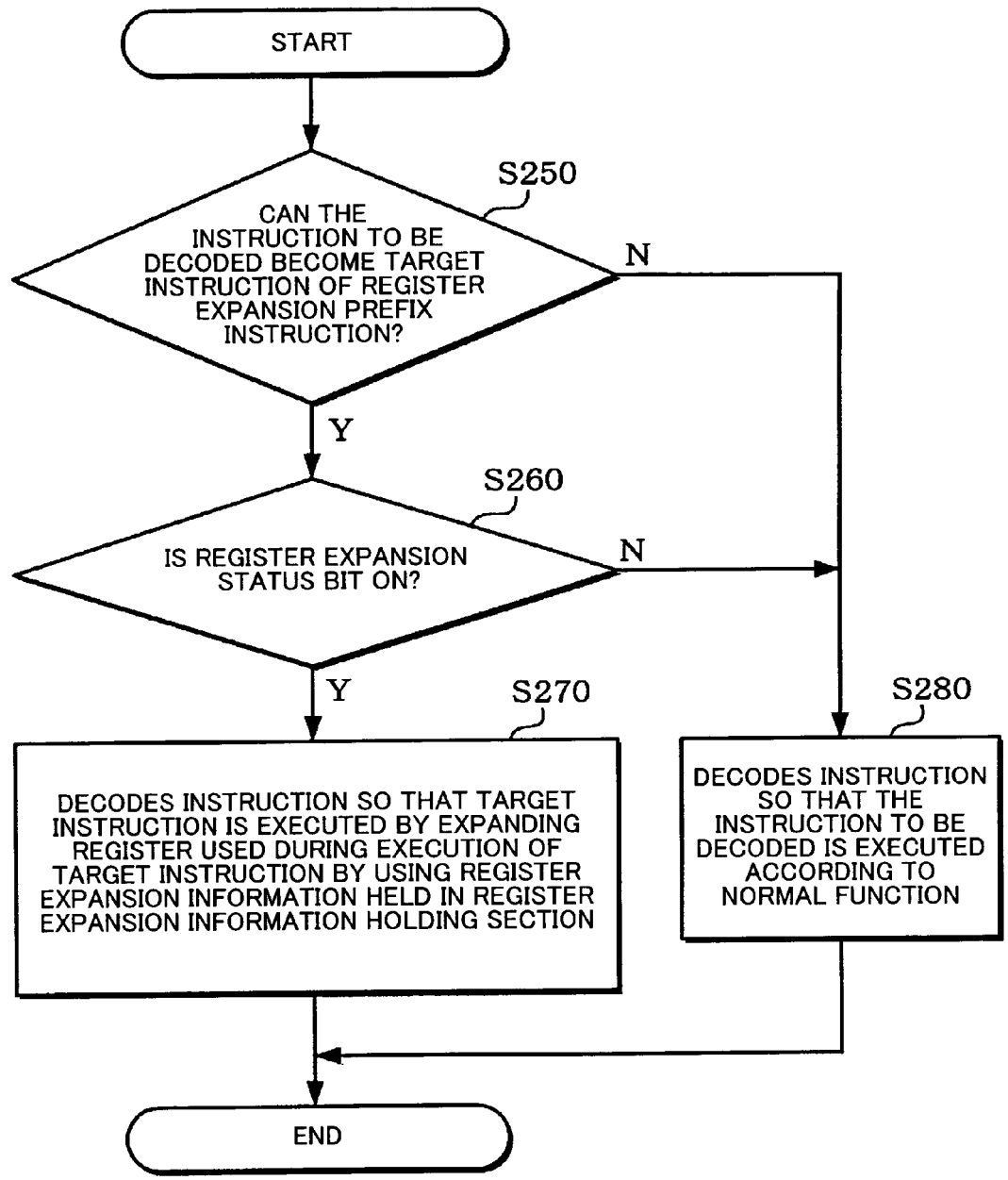
FIG. 14 is a flowchart illustrating process flow for decoding a decode instruction including a target instruction of a register expansion prefix instruction.

FIG. 14 is a flowchart illustrating process flow for decoding the decode instruction including a target instruction of the register expansion prefix instruction.

The decoder circuit judges whether or not the decode instruction can become a target instruction of the register expansion prefix instruction (step S250). In this case, since the instruction which can become a target instruction of the register expansion prefix instruction is specified in advance, it may be judged by comparing the instruction code of the decode instruction with the instruction code of the instruction which can become a target instruction of the register expansion prefix instruction which is specified in advance.

If the decode instruction can become a target instruction of the register expansion prefix instruction, the decoder circuit judges whether or not the register expansion status bit is ON (step S260).

If the register expansion status bit is ON, the decoder circuit decodes the instruction so that the target instruction is executed by expanding the register used during execution of the target instruction by using the register expansion information held in the register expansion information storing section of the target instruction modifying information register (step S270).

If the decode instruction cannot become a target instruction of the register expansion prefix instruction, or if the register expansion status bit is OFF, the decoder circuit decodes the instruction so that the decode instruction is executed according to a normal function (step S280).

5. Execution Control Prefix Instruction

FIGS. 15A, 15B, and 15C are views illustrating an execution control prefix instruction.

FIG. 15A is a view showing a bit field of an instruction code of an execution control prefix instruction. As shown in FIG. 15A, an instruction code 330 of the execution control prefix instruction includes an opcode designation region 332 from the bit 15 to the bit 4, and an execution control condition judgment code 334 from the bit 3 to the bit 0.

An opcode which indicates that the instruction is an execution control prefix instruction is stored in the opcode designation region 332. Various execution control condition judgment codes such as "LT", "LE", "GT", "GE", "EQ", "NE", . . . are stored in the execution control condition judgment code 334. For example, "LT" indicates that the target instruction is replaced with an NOP instruction if "% r1 is smaller than % r2" in "cmp % r1, % r2".

FIG. 15B is a view showing a use example of the execution control prefix instruction. FIG. 15C is a view illustrating an operation in the use example shown in FIG. 15B.

As shown in FIGS. 15B and 15C, an ext instruction (execution control prefix instruction) is placed after a cmp instruction (compare instruction), and has a function of controlling whether or not to execute a target instruction (add instruction) subsequent to the ext instruction (execution control prefix instruction) depending on comparison results of the compare instruction.

Figure 16:
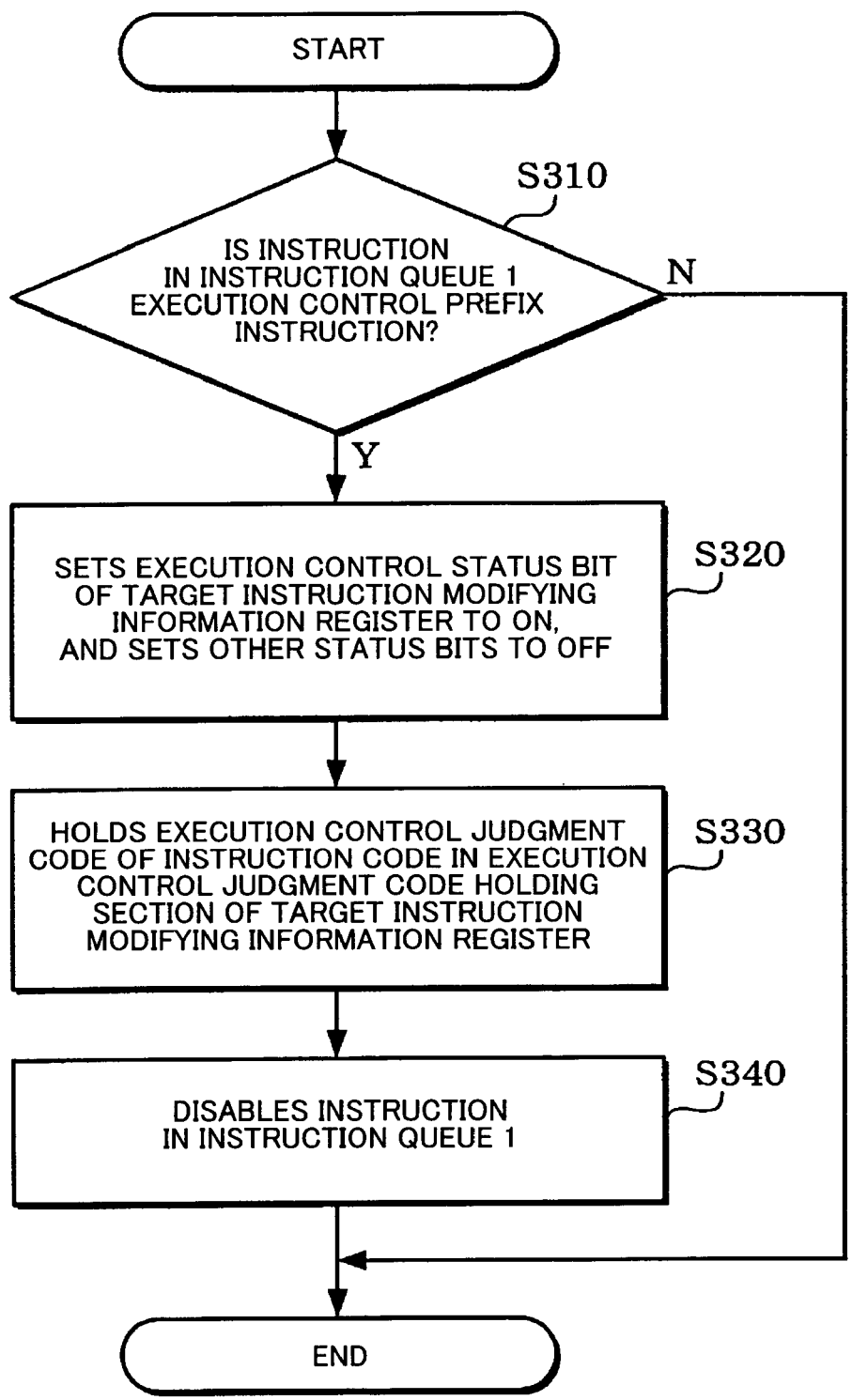
FIG. 16 is a flowchart illustrating process flow in which a prefix instruction decoder circuit decodes an instruction in an instruction queue in the case where a prefix instruction is an execution control prefix instruction.

FIG. 16 is a flowchart illustrating process flow in which the prefix instruction decoder circuit decodes the instruction in the instruction queue in the case where the prefix instruction is an execution control prefix instruction.

The prefix instruction decoder circuit judges whether or not the instruction stored in the instruction queue 1 is an execution control prefix instruction, and performs the following processing if the instruction is an execution control prefix instruction (step S310).

The prefix instruction decoder circuit sets an execution control status bit of the target instruction modifying information register to ON, and sets other status bits to OFF (step S320).

The prefix instruction decoder circuit holds the execution control judgment code of the instruction code in an execution control judgment code storing section of the target instruction modifying information register (step S330).

The prefix instruction decoder circuit then disables the instruction in the instruction queue 1 (step S340). The step of disabling the instruction in the instruction queue 1 includes processing necessary for controlling so that the instruction in the instruction queue 1 is not decoded by the decoder circuit.

Figure 17:
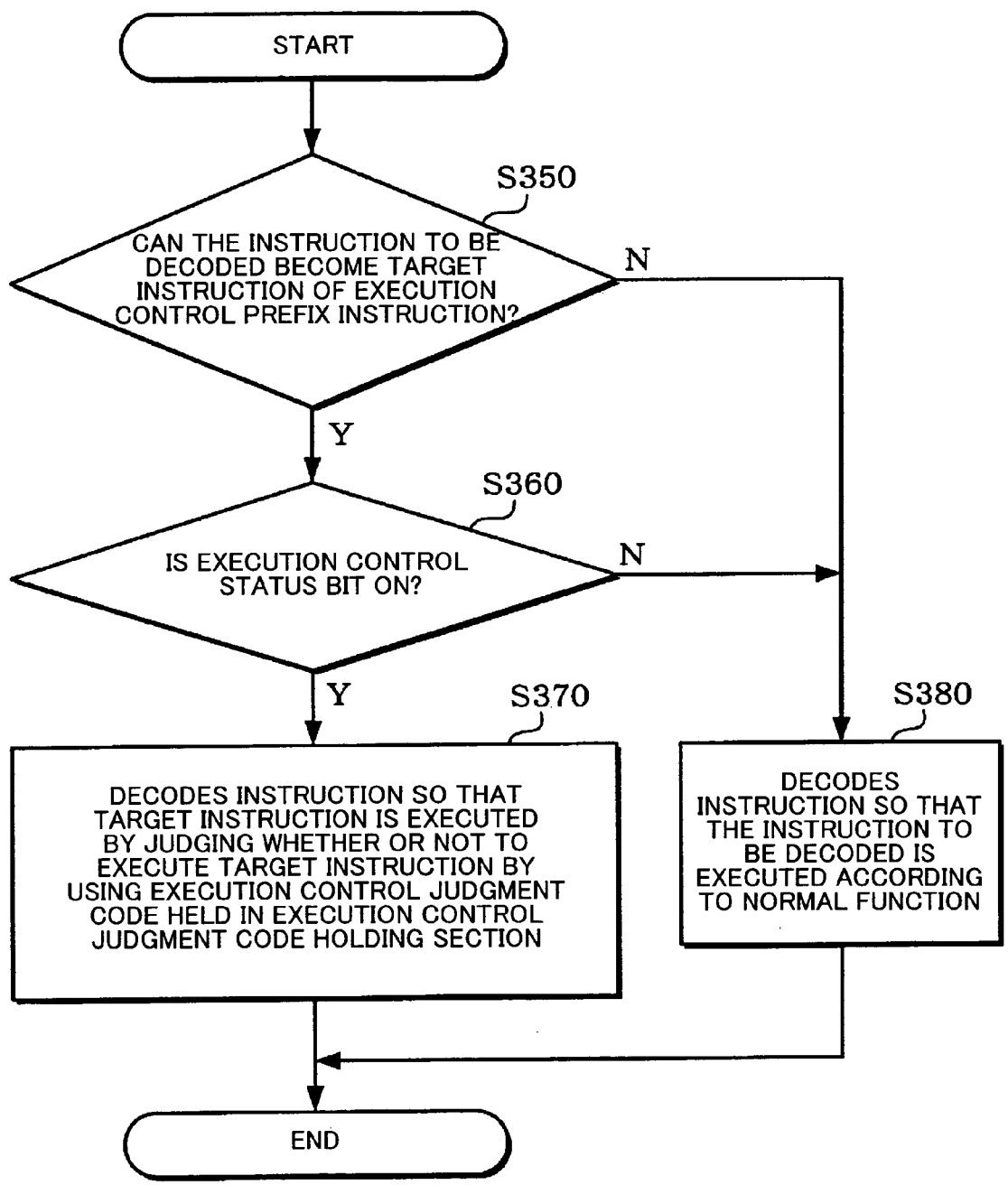
FIG. 17 is a flowchart illustrating process flow for decoding a decode instruction including a target instruction of an execution control prefix instruction.

FIG. 17 is a flowchart illustrating process flow for decoding the decode instruction including a target instruction of the execution control prefix instruction.

The decoder circuit judges whether or not the decode instruction can become a target instruction of the execution control prefix instruction (step S350). In this case, since the instruction which can become a target instruction of the execution control prefix instruction is specified in advance, it may be judged by comparing the instruction code of the decode instruction with the instruction code of the instruction which can become a target instruction of the execution control prefix instruction which is specified in advance.

If the decode instruction can become a target instruction of an execution control prefix instruction, the decoder circuit judges whether or not the execution control status bit is ON (step S360).

If the execution control status bit is ON, the decoder circuit decodes the instruction so that the target instruction is executed by judging whether or not to execute the target instruction by using the execution control condition judgment code held in the execution control condition judgment code information storing section of the target instruction modifying information register (step S370).

If the decode instruction cannot become a target instruction of the execution control prefix instruction, or if the execution control status bit is OFF, the decoder circuit decodes the instruction so that the decode instruction is executed according to a normal function (step S380).

6. Electronic Equipment

Electronic equipment including the above microcomputer is described below.

Figure 18A:
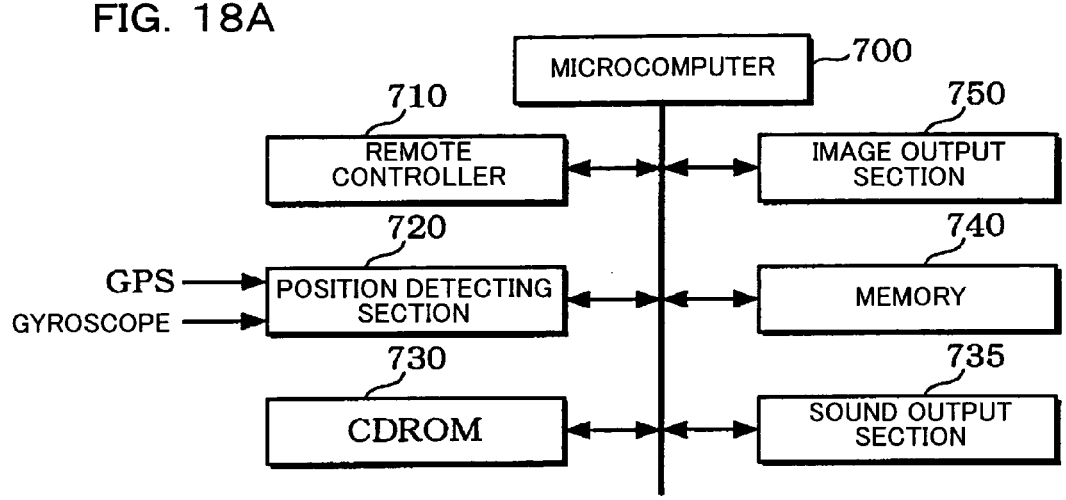
FIGS. 18A to 18C show examples of block diagrams of electronic equipment including a microcomputer.
Figure 19A:
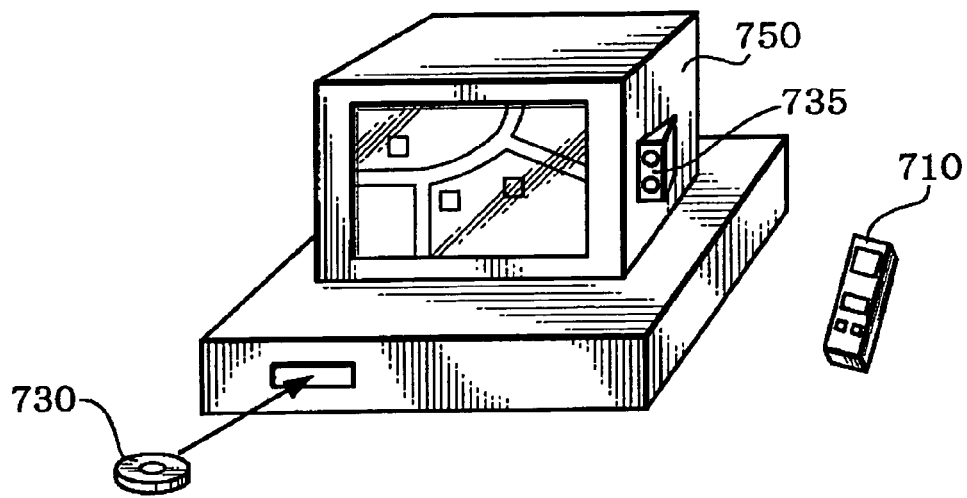
FIGS. 19A to 19C show examples of external views of various types of electronic equipment.

FIG. 18A is an internal block diagram of a car navigation system which is an example of electronic equipment. FIG. 19A is an external view of the car navigation system. The car navigation system is operated by using a remote controller 710. A position detecting section 720 detects the position of a vehicle based on information from the GPS (global positioning system) or a gyroscope. Information such as a map is stored in a CD-ROM 730 (information recording medium). A memory 740 becomes a work area during image processing or voice processing. An image generated is displayed for the driver by using an image output section 750. Guide voice for car navigation is generated and output for the driver by using a sound output section 735. A microcomputer 700 inputs information thereto from information sources such as the remote controller 710, the position detecting section 720, and the CD-ROM 730, performs various types of processing, and outputs the processed information by using output devices such as the image output section 750 and the sound output section 735.

Figure 18B:
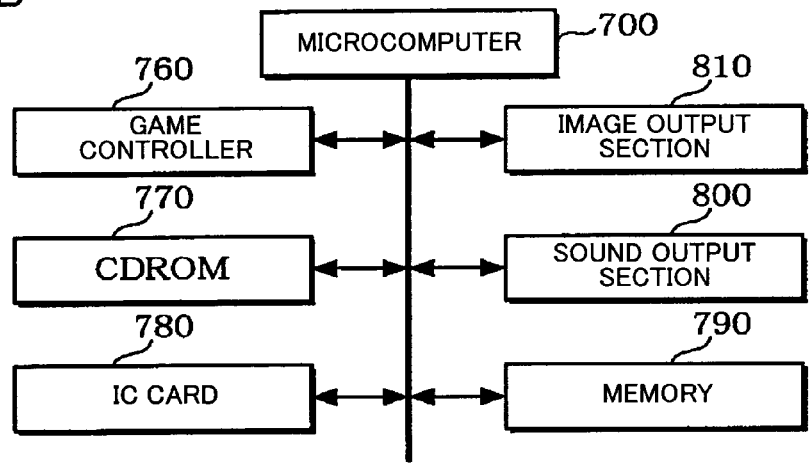
Figure 19B:
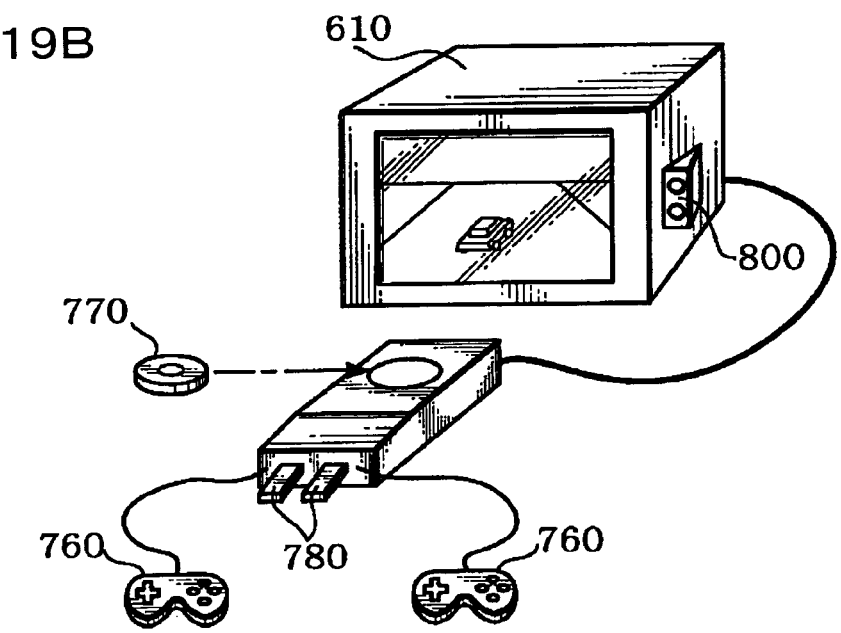

FIG. 18B shows an internal block diagram of a game device which is another example of electronic equipment. FIG. 19B is an external view of the game device. This game device generates a game image and game sound by using a memory 790 as a work area based on operation information of the player from a game controller 760, a game program from a CD-ROM 770, player information from an IC card 780, and the like, and outputs the game image and game sound by using an image output section 810 and a sound output section 800.

Figure 18C:
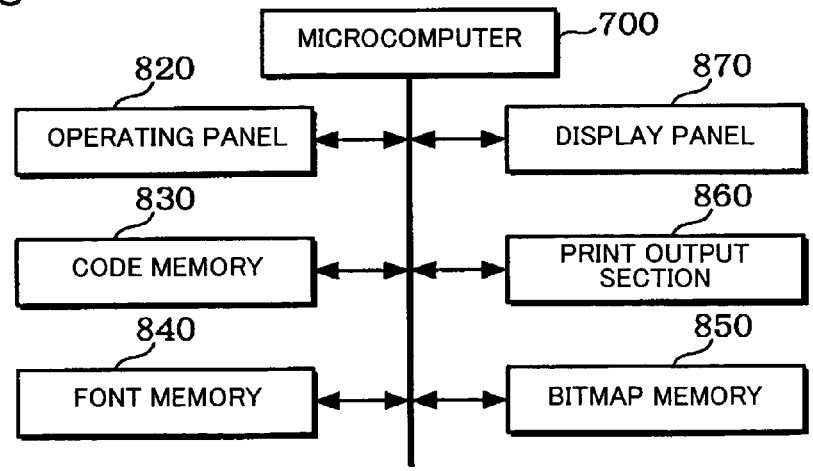
Figure 19C:
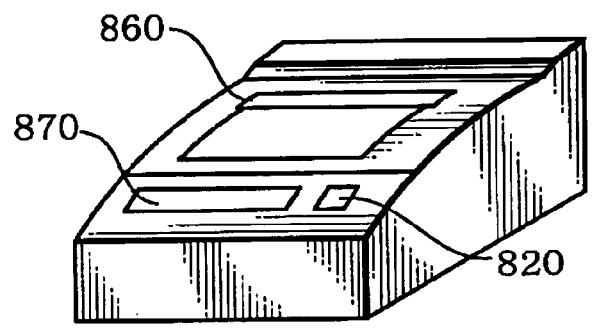

FIG. 18C shows an internal block diagram of a printer which is still another example of electronic equipment. FIG. 19C is an external view of the printer. This printer generates a print image by using a bitmap memory 850 as a work area based on operation information from an operating panel 820 and character information from a code memory 830 and a font memory 840, and outputs the image by using a print output section 860. The printer informs the user of a state and a mode of the printer by using a display panel 870.

As other examples of electronic equipment to which the microcomputer can be applied, a cellular phone, PHS, pager, portable information terminal, digital camera, hard disk device, optical disc (CD and DVD) device, magneto-optical disc (MO) device, audio equipment, electronic notebook, electronic calculator, POS terminal, device equipped with a touch panel, projector, word processor, personal computer, TV, and view finder type or direct viewfinder type video tape recorder can be given.

The present invention is not limited to the above embodiment. Various modifications and variations are possible within the spirit and scope of the present invention.

The configuration of the electronic equipment of the present invention is not limited to the configurations described with reference to FIGS. 18A to 18C and FIGS. 19A to 19C. Various modifications and variations are possible within the spirit and scope of the present invention.

What is claimed is:

1. A data processing device which performs pipeline control, the data processing device comprising:
    a fetch circuit which fetches instruction codes of a plurality of instructions in instruction queues, the instructions including a given target instruction and a prefix instruction which precedes the target instruction and modifies a function of the target instruction;
    a prefix instruction decoder circuit which performs decode processing only on a prefix instruction, the prefix instruction decoder circuit receiving the instruction codes of the instructions before decoding that are fetched in the instruction queues, judging whether or not each of the instruction codes is a given prefix instruction, and causing a target instruction modifying information register to store information necessary for decoding the target instruction modified by the prefix instruction when the judged instruction code is the given prefix instruction; and
    a general-purpose decoder circuit which receives each of the instruction codes of the instructions fetched in the instruction queues other than the prefix instruction as a decode instruction, and decodes the decode instruction,
    wherein, when the decode instruction is the target instruction, the decoder circuit decodes the target instruction modified by the prefix instruction based on target instruction modifying information stored in the target instruction modifying information register,
    wherein the given prefix instruction includes a shift prefix instruction for shifting an execution result of the target instruction, the function of which is expanded by the prefix instruction,
    wherein the prefix instruction decoder circuit causes the target instruction modifying information register to store shift information necessary for shifting the execution results of the target instruction modified by the shift prefix instruction when the input instruction code is the shift prefix instruction, and
    wherein the decoder circuit decodes the decode instruction so that the execution result of the target instruction modified by the shift prefix instruction is shifted based on the shift information stored in the target instruction modifying information register for execution of the target instruction when the decode instruction is the target instruction of the shift prefix instruction.

2. The data processing device as defined in claim 1, wherein the given prefix instruction includes an immediate-data expansion prefix instruction for expanding immediate data necessary for execution of the target instruction, the function of which is expanded by the prefix instruction,
    wherein the prefix instruction decoder circuit causes the target instruction modifying information register to store immediate-data expansion information necessary for expanding the immediate data during execution of the target instruction modified by the immediate-data expansion prefix instruction when the input instruction code is the immediate-data expansion prefix instruction, and
    wherein the decoder circuit decodes the decode instruction so that the immediate data is expanded at the time of execution of the target instruction that has been modified by the immediate-data expansion prefix instruction based on the immediate-data expansion information stored in the target instruction modifying information register when the decode instruction is the target instruction of the immediate-data expansion prefix instruction.

3. The data processing device as defined in claim 1, wherein the given prefix instruction includes a register expansion prefix instruction for expanding a register necessary for execution of the target instruction, the function of which is expanded by the prefix instruction,
    wherein the prefix instruction decoder circuit causes the target instruction modifying information register to store register expansion information necessary for expanding the register during execution of the target instruction modified by the register expansion prefix instruction when the input instruction code is the register expansion prefix instruction, and
    wherein the decoder circuit decodes the decode instruction so that the register is expanded at a time of execution of the target instruction that has been modified by the register expansion prefix instruction based on the register expansion information stored in the target instruction modifying information register when the decode instruction is the target instruction of the register expansion prefix instruction.

4. The data processing device as defined in claim 3, wherein the target instruction is located subsequent to the prefix instruction which modifies the target instruction, and
    wherein the prefix instruction decoder circuit performs decode processing only on the prefix instruction for a second instruction subsequent to a first instruction during a period in which the decoder circuit decodes the first instruction.

5. Electronic equipment comprising:
    the data processing device as defined in claim 3;
    means which receives input information; and
    means which outputs a result processed by the data processing device based on the input information.

6. The data processing device as defined in claim 1, wherein the fetch circuit is connected with a bus having a width at least twice the width of the instruction code, and fetches the instructions in the instruction queues through the bus in one clock cycle.

7. The data processing device as defined in claim 6, wherein the target instruction is located subsequent to the prefix instruction which modifies the target instruction, and
    wherein the prefix instruction decoder circuit performs decode processing only on the prefix instruction for a second instruction subsequent to a first instruction during a period in which the decoder circuit decodes the first instruction.

8. Electronic equipment comprising:
the data processing device as defined in claim 6;
means which receives input information; and
means which outputs a result processed by the data processing device based on the input information.

9. The data processing device as defined in claim 1,
wherein the target instruction is located subsequent to the prefix instruction which modifies the target instruction, and
wherein the prefix instruction decoder circuit performs decode processing only on the prefix instruction for a second instruction subsequent to a first instruction during a period in which the decoder circuit decodes the first instruction.

10. Electronic equipment comprising:
the data processing device as defined in claim 9;
means which receives input information; and
means which outputs a result processed by the data processing device based on the input information.

11. The data processing device as defined in claim 1,
wherein the target instruction is located subsequent to the prefix instruction which modifies the target instruction, and
wherein the prefix instruction decoder circuit performs decode processing only on the prefix instruction for a second instruction subsequent to a first instruction during a period in which the decoder circuit decodes the first instruction.

12. Electronic equipment comprising:
the data processing device as defined in claim 1;
means which receives input information; and
means which outputs a result processed by the data processing device based on the input information.

13. A data processing device which performs pipeline control, the data processing device comprising:
a fetch circuit which fetches instruction codes of a plurality of instructions in instruction queues, the instructions including a given target instruction and a prefix instruction which precedes the target instruction and modifies a function of the target instruction;
a prefix instruction decoder circuit which performs decode processing only on a prefix instruction, the prefix instruction decoder circuit receiving the instruction codes of the instructions before decoding that are fetched in the instruction queues, judging whether or not each of the instruction codes is a given prefix instruction, and causing a target instruction modifying information register to store information necessary for decoding the target instruction modified by the prefix instruction when the judged instruction code is the given prefix instruction; and
a general-purpose decoder circuit which receives each of the instruction codes of the instructions fetched in the instruction queues other than the prefix instruction as a decode instruction, and decodes the decode instruction,
wherein, when the decode instruction is the target instruction, the decoder circuit decodes the target instruction modified by the prefix instruction based on target instruction modifying information stored in the target instruction modifying information register,
wherein the given prefix instruction includes an execution control prefix instruction for controlling whether or not to execute the target instruction, the function of which is expanded by the prefix instruction,
wherein the prefix instruction decoder circuit causes the target instruction modifying information register to store execution control information necessary for controlling whether or not to execute the target instruction modified by the execution control prefix instruction when the input instruction code is the execution control prefix instruction, and
wherein the decoder circuit decodes the decode instruction so that the target instruction modified by the execution control prefix instruction is executed by judging whether or not to execute the target instruction based on the execution control information stored in the target instruction modifying information register when the decode instruction is the target instruction of the execution control prefix instruction.

14. The data processing device as defined in claim 13,
wherein the target instruction is located subsequent to the prefix instruction which modifies the target instruction, and
wherein the prefix instruction decoder circuit performs decode processing only on the prefix instruction for a second instruction subsequent to a first instruction during a period in which the decoder circuit decodes the first instruction.

15. The data processing device as defined in claim 13,
wherein the target instruction is located subsequent to the prefix instruction which modifies the target instruction, and
wherein the prefix instruction decoder circuit performs decode processing only on the prefix instruction for a second instruction subsequent to a first instruction during a period in which the decoder circuit decodes the first instruction.

16. Electronic equipment comprising:
the data processing device as defined in claim 13;
means which receives input information; and
means which outputs a result processed by the data processing device based on the input information.

17. The data processing device as defined in claim 13,
wherein the given prefix instruction includes an immediate-data expansion prefix instruction for expanding immediate data necessary for execution of the target instruction, the function of which is expanded by the prefix instruction,
wherein the prefix instruction decoder circuit causes the target instruction modifying information register to store immediate-data expansion information necessary for expanding the immediate data during execution of the target instruction modified by the immediate-data expansion prefix instruction when the input instruction code is the immediate-data expansion prefix instruction, and
wherein the decoder circuit decodes the decode instruction so that the immediate data is expanded at the time of execution of the target instruction that has been modified by the immediate-data expansion prefix instruction based on the immediate-data expansion information stored in the target instruction modifying information register when the decode instruction is the target instruction of the immediate-data expansion prefix instruction.

18. The data processing device as defined in claim 13,
wherein the given prefix instruction includes a register expansion prefix instruction for expanding a register necessary for execution of the target instruction, function of which is expanded by the prefix instruction, wherein the prefix instruction decoder circuit causes the target instruction modifying information register to store register expansion information necessary for expanding the register during execution of the target instruction modified by the register expansion prefix instruction when the input instruction code is the register expansion prefix instruction, and wherein the decoder circuit decodes the decode instruction so that the register is expanded at a time of execution of the target instruction that has been modified by the register expansion prefix instruction based on the register expansion information stored in the target instruction modifying information register when the decode instruction is the target instruction of the register expansion prefix instruction.

19. The data processing device as defined in claim 13, wherein the fetch circuit is connected with a bus having a width at least twice the width of the instruction code, and fetches the instructions in the instruction queues through the bus in one clock cycle.

* * * * *